United States Patent
Guo

(10) Patent No.: US 11,184,805 B2
(45) Date of Patent: Nov. 23, 2021

(54) QUALITY OF SERVICE CONTROL METHOD AND RELATED DEVICE

(71) Applicant: CHINA ACADEMY OF TELECOMMUNICATIONS TECHNOLOGY, Beijing (CN)

(72) Inventor: Yali Guo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 26 days.

(21) Appl. No.: 16/622,424

(22) PCT Filed: Apr. 4, 2018

(86) PCT No.: PCT/CN2018/081889
§ 371 (c)(1),
(2) Date: Dec. 13, 2019

(87) PCT Pub. No.: WO2018/228032
PCT Pub. Date: Dec. 20, 2018

(65) Prior Publication Data
US 2020/0145884 A1 May 7, 2020

Related U.S. Application Data

(63) Continuation of application No. PCT/CN2018/081889, filed on Apr. 4, 2018.

(30) Foreign Application Priority Data

Jun. 16, 2017 (CN) .......................... 201710459204.5

(51) Int. Cl.
*H04W 28/24* (2009.01)
*H04M 15/00* (2006.01)
(Continued)

(52) U.S. Cl.
CPC ........... *H04W 28/24* (2013.01); *H04M 15/66* (2013.01); *H04W 28/0268* (2013.01); *H04W 80/10* (2013.01); *H04L 61/2007* (2013.01)

(58) Field of Classification Search
CPC . H04W 28/24; H04W 28/0268; H04W 80/10; H04M 15/66; H04L 61/2007
(Continued)

(56) References Cited

U.S. PATENT DOCUMENTS

2013/0316673 A1 11/2013 Goldner
2017/0359749 A1* 12/2017 Dao ..................... H04L 47/2416
(Continued)

FOREIGN PATENT DOCUMENTS

| CN | 103581047 A | 2/2014 |
|----|-------------|--------|
| CN | 104683956 A | 6/2015 |

OTHER PUBLICATIONS

Extended European Search Reported dated May 8, 2020 for Application No. EP 18816583.1.
(Continued)

*Primary Examiner* — Obaidul Huq
(74) *Attorney, Agent, or Firm* — Harness, Dickey & Pierce, P.L.C.

(57) ABSTRACT

A QoS control method and related devices are provided. In a QoS control method, for the service for which the reflective applies, a PCF adds a reflective indication in a PCC rule. If the reflective QoS is based on a control plane, a SMF aggregates services for which the reflective QoS applies and does not apply in different data flows, and a UE may determine the service for which the reflective QoS applies based on QFI. If the reflective QoS is based on a user plane, a SMF aggregates services having a same QoS requirement in a same data flow, and configures a reflective indication to the service for which the reflective QoS applies, and the UE
(Continued)

may apply the reflective QoS based on the reflective indication in the data packet.

8 Claims, 11 Drawing Sheets

(51) Int. Cl.
  *H04W 28/02* (2009.01)
  *H04W 80/10* (2009.01)
  *H04L 29/12* (2006.01)
(58) Field of Classification Search
  USPC .................................................. 370/298, 299
  See application file for complete search history.

(56) References Cited

U.S. PATENT DOCUMENTS

2018/0234876 A1* 8/2018 Jheng ................... H04L 47/2441
2018/0317120 A1* 11/2018 Wang ................ H04W 28/0263

OTHER PUBLICATIONS

ZTE, et al., "Consideration on reflective QoS indication", 3GPP TSG-RAN WG2 NR Ad Hoc, R2-1700160, vol. RAN Wg2, No. Spokane, USA, Jan. 17-19, 2017.

Media Tek Inc., "pCR 23.501; Modification of Reflective QoS", 3GPP Draft, S2-171894, SA WG2 Meeting #119, Feb. 13-17, 2017 Dubrovnik, Croatia.
Media Tek Inc., "pCR 23,501 Deactivation of UE-derived QoS rules for Reflective QoS", 3GPP, S2-173147, SA WG2 Meeting #121, Mar. 27-31, Hangzhou PRC.
Written Opinion of the International Searching Authority dated Jun. 27, 2018 for PCT/CN2018/081889.
Catt, "Update to the interim agreements of Reflective QoS", SAWG2 Meeting #118, S2-166635, Nov. 14-18, 2016, Reno, Nevada.
Ericsson, "Interim Agreement on Reflective QoS", SA WG2 Meeting #117, S2-165539, Oct. 17-21, 2016, Kaohsiung, Taiwan.
Chinese Office Action dated Mar. 20, 2020 for CN Application No. 201710459204.5.
Catt, "23.502 PDU Session Modification procedures", SA WG2 Meeting #119, S2-171005, Feb. 13-17, 2017, Dubrovnik, Croatia.
Taiwanese Office Action dated Mar. 3, 2020 for Application No. CN 108120266.
European Patent Office Action dated Mar. 26, 2021 for EP Application No. 18 816 583.1.
Ericssson, "QoS Model Updates", 3GPP TSG-CT WG3 Meeting #90; C3-173138, 3rd Generation Partnership Project (3GPP), Zhangiajie, China, May 16-19, 2017.
Japanese Office Action for JP Application No. 2019-569790 dated Jan. 19, 2021.
SA WG2, Presentation of TR 23.501: "System Architecture for the 5G System (Release 15) to TSG SA for Approval", TD SP-170384, 3GPP TSG SA Meeting #76, Jun. 7-9, 2017, West Palm Beach, Florida.

* cited by examiner

QUALITY OF SERVICE CONTROL METHOD AND RELATED DEVICE

CROSS-REFERENCE TO RELATED APPLICATIONS

The present application is the U.S. national phase of PCT Application No. PCT/CN2018/081889 filed on Apr. 4, 2018, which claims a priority of the Chinese patent application No. 201710459204.5 filed in China on Jun. 16, 2017, disclosures of each of which are incorporated herein by reference in their entireties.

TECHNICAL FIELD

The present disclosure relates to the field of communication technology, in particular to a Quality of Service (QoS) control method and a QoS control device.

BACKGROUND

In a new-generation network, diversity of services is supported. For a wide variety of Internet services, data streams of some services have a large number of discontinuous Internet Protocol (IP) addresses, and the IP addresses of the data streams of some services are frequently changed. Under these situations, a traditional Quality of Service (QoS) control mechanisms are used, a Non-Access-Stratum (NAS) signaling packet filter needs to be sent frequently to a user equipment (UE), or a large number of packet filters is carried in the NAS signaling and transmitted to the UE, which brings a lot of signaling burden to the UE and the network.

Therefore, in a 5G network, after the UE receives the downlink data packet, a reflective strategy is applied to the downlink data, the IP address of the downlink header is reflected to obtain the packet filter of the uplink data. The UE generates an uplink QoS rule by itself. The uplink data are transmitted using the same QoS parameters as the downlink data, thereby avoiding the problem of transmitting a large number of NAS messages carrying the uplink QoS rule to the UE.

For the 5G network, there is no specific reflective strategy. How to instruct the UE to perform the reflective QoS, end the reflective QoS, and obtain a proper QoS rule to the uplink data are all technical problems that need to be solved urgently.

SUMMARY

The disclosure aims to solve the problem in the related art of the aggregation of service data flows after introducing a reflective strategy, and how to ensure the UE to apply the reflective QoS properly according to the instruction from the network and generate the uplink QoS rule, so that the 5G network supports the internet services.

In one aspect, a Quality of Service (QoS) control method, applied to a policy control function node (PCF), includes: determining a service for which a reflective QoS applies; and transmitting a policy and charging control (PCC) rule to a session management function node (SMF), wherein the PCC rule carries packet filter information, a QoS requirement, and a reflective indication of the service corresponding to the PCC rule, the reflective indication is used to indicate that the reflective QoS applies for the service corresponding to the PCC rule.

Optionally, the determining a service for which a reflective QoS applies includes: determining a service in which an internet protocol (IP) address of a data flow is changed as a service for which the reflective QoS applies; and/or determining a service in which the data flow has discontinuous IP addresses and the number of the discontinuous IP addresses is greater than a preset threshold as a service for which the reflective QoS applies.

In another aspect, a Quality of Service (QoS) control method, applied to a session management function node (SMF), includes: receiving a policy and charging control (PCC) rule carrying a QoS requirement, packet filter information, and a reflective indication, the reflective indication for indicating that the reflective QoS applies for a service corresponding to the PCC rule; associating the PCC rule having a same QoS requirement and including the reflective indication to a same QoS data flow, and assigning a corresponding QoS flow identifier to each QoS data flow; transmitting a QoS flow identifier indication message to a user equipment (UE), the QoS flow identifier indication message carrying a QoS flow identifier of a service for which the reflective QoS applies, and the reflective indication information for indicating that the reflective applies for the QoS flow identifier, so that the UE determines, according to the QoS flow identifier indication message, a QoS flow identifier of a service for which the reflective QoS applies; and transmitting a configuration message of the service to a user plane function node (UPF), where the configuration message carries the packet filter information and the QoS flow identifier of the service, so that the UPF matches a downlink data packet of the service corresponding to the configuration message according to the packet filter information in the configuration message, and adds the QoS flow identifier in the configuration message to a packet header of the matched downlink data, so that when the UE receives a subsequent downlink data packet, the UE compares a QoS data flow identifier of the packet header of the subsequent downlink data packet and a QoS data flow identifier determined by the QoS flow identifier indication message, and determines whether to apply the reflective QoS for the service of the subsequent downlink data packet, and when the UE determines that the reflective QoS needs to be initiated for the service of the downlink data packet, the reflective QoS is applied for the service to obtain a QoS configuration of an uplink data packet of the service.

In yet another aspect, a Quality of Service (QoS) control method, applied to a session management function node (SMF), includes: receiving from a policy control function node (PCF) a policy and charging control (PCC) rule carrying a QoS requirement, packet filter information, and a reflective indication, wherein the reflective indication is used to indicate that reflective QoS applies for a service corresponding to the PCC rule; associating the PCC rule having the same QoS requirement to a same QoS data flow, and assigning a corresponding QoS flow identifier to each data flow; and transmitting a configuration message of the service to a user plane function node (UPF), wherein the configuration message carries packet filter information and a QoS flow identifier of the service, and when the reflective QoS applies for the service, the configuration message further carries a reflective indication, so that the UFP matches a downlink data packet of the service corresponding to the configuration message according to the packet filter information in the configuration message, and adds a QoS flow identifier of the corresponding service to a packet header of the matched downlink data packet, and adds a reflective indication to the packet header of the downlink data packet when the downlink data packet belongs to the service for which the reflective QoS applies, so that a user equipment (UE) receives a subsequent downlink data packet, the UE determines to apply the reflective QoS on the received downlink data packet according to the reflective indication in the data packet header.

In yet another aspect, a Quality of Service (QoS) control method, applied to a user plane function node (UPF), includes: receiving a configuration message of a service from a session management function node (SMF), wherein the configuration message carries packet filter information and a QoS flow identifier of the service, the services having the same QoS requirement and for which reflective QoS applies have the same QoS flow identifier; matching a downlink data packet of the service corresponding to the configuration message based on the packet filter information in the configuration message; adding the QoS flow identifier of the service to a packet header of the matched downlink data packet; and transmitting the downlink data packet to a user equipment (UE).

Optionally, the method further includes: starting timing for the service corresponding to the downlink data packet when the downlink data packet is transmitted to the UE; restarting timing if other downlink data packets of the service are received before a time duration reaches a first time threshold; deleting the packet filter information of the service if the service ends before the time duration reaches the first time threshold; and generating a downlink data packet of the service by simulation when the timing duration reaches the first time threshold and if other downlink data packets of the service are not received and the service is not end, transmitting the downlink data packet generated by the simulation to the UE, wherein the downlink data packet generated by the simulation and a downlink data packet that is in the same service and not generated by simulation have a same header.

Optionally, the method further includes: deleting the packet filter information of the service when it is determined that the service corresponding to the downlink data packet ends, generating an end indication data packet of the service and transmitting the end indication data packet to the UE.

In yet another aspect, a Quality of Service (QoS) control method, applied to a user plane function node (UPF), includes: receiving a configuration message of a service from a session management function node (SMF), wherein the configuration message carries packet filter information and a QoS flow identifier of the service, when reflective QoS applies for the service, the configuration message further carries a reflective indication, services with the same QoS requirement have a same QoS flow identifier; matching a downlink data packet of the service corresponding to the configuration message according to the packet filter information in the configuration message; adding a QoS flow identifier of the corresponding service in the packet header of the downlink data packet, and adding the reflective indication in a packet header of the downlink data packet when the downlink data packet belongs to a service for which the reflective QoS applies; and transmitting the downlink data packet to the UE.

Optionally, the method further includes: starting timing for the service corresponding to the downlink data packet when the downlink data packet is transmitted to the UE; restarting timing if other downlink data packets of the service are received before a time duration reaches a first time threshold; deleting the packet filter information of the service if the service ends before the time duration reaches the first time threshold; and generating a downlink data packet of the service by simulation when the time duration reaches the first time threshold, if the other downlink data packets of the service are not received and the service is not end, and transmitting the downlink data packet generated by simulation to the UE, wherein the downlink data packet generated by the simulation and a downlink data packet that is in the same service and not generated by simulation have a same header.

Optionally, the method further includes: deleting the packet filter information of the service when the service corresponding to the downlink data packet is determined to end; and transmitting an end indication data packet to UE.

In yet another aspect, a Quality of Service (QoS) control method, applied to a user equipment (UE), includes: receiving a QoS flow identifier indication message from a session management function node (SMF), wherein the QoS flow identifier indication message carries a QoS flow identifier of a service for which the reflective QoS applies and a reflective indication message for indicating the reflective applies for the QoS flow identifier; determining, according to the QoS flow identifier indication message, the QoS flow identifier for which the reflective QoS applies; receiving a downlink data packet from a user plane function node (UPF), wherein a packet header of the downlink data packet carries a QoS flow identifier of the service; determining whether to apply the reflective QoS for the service corresponding to the downlink data packet by comparing the QoS flow identifier carried in the downlink data packet and the determined QoS flow identifier for which the reflective QoS applies; applying the reflective QoS when it is determined to apply the reflective QoS for the downlink data packet and determining QoS configuration of an uplink data packet that belongs to the same service as the downlink data packet; and performing the QoS configuration of the uplink data packet.

Optionally, the method further includes: starting timing when performing the QoS configuration of the uplink data packet; restarting timing if the downlink data packet that belongs to the same service as the uplink data packet is received before the time duration reaches a second time threshold; and stopping performing the QoS configuration of the uplink data packet if the downlink data packet that belongs to the same service as the uplink data packet is not received when the time duration reaches the second time threshold.

Optionally, the method further includes: stopping performing the QoS configuration of the uplink data packet when an end indication data packet corresponding to the service of the uplink data packet sent by the UFF during performing the QoS configuration of the uplink data packet is received.

In yet another aspect, a Quality of Service (QoS) control method, applied to a user equipment (UE), includes: receiving a downlink data packet from a user plane function node (UPF), wherein the downlink data packet carries a QoS flow identifier of a service corresponding to the downlink data packet, and when the downlink data packet belongs to a service for which the reflective QoS applies, the downlink data packet further carries a reflective indication; applying the reflective QoS when the downlink data packets carries the reflective indication, and determining QoS configuration of an uplink data packet that belongs to the same service as the downlink data packet; and performing the QoS configuration of the uplink data packet.

Optionally, the method further includes: starting timing when performing the QoS configuration of the uplink data packet; restarting timing if the downlink data packet that belongs to the same service as the uplink data packet is received before the time duration reaches a second time threshold; stopping performing the QoS configuration of the uplink data packet if the downlink data packet that belongs to the same service as the uplink data packet is not received when the time duration reaches the second time threshold.

Optionally, the method further includes: stopping performing the QoS configuration of the uplink data packet when an end indication data packet corresponding to the service of the uplink data packet sent by the UFF during performing the QoS configuration of the uplink data packet is received.

In yet another aspect, a policy control function node (PCF) includes: a determining module, configured to determine a service for which a reflective QoS applies; and a transmitting module, configured to transmit a policy and charging control (PCC) rule to a session management function node (SMF), wherein the PCC rule carries packet filter information, a QoS requirement, and a reflective indication of the service corresponding to the PCC rule, the reflective indication is used to indicate that the reflective QoS applies for the service corresponding to the PCC rule.

Optionally, the determining module includes: a first determining sub-module, configured to determine a service in which an internet protocol (IP) address of a data flow is changed as a service for which the reflective QoS applies; and/or a second determining sub-module, configured to determine a service in which the data flow has discontinuous IP addresses and the number of the discontinuous IP addresses is greater than a preset threshold as a service for which the reflective QoS applies.

In yet another aspect, a session management function node (SMF), includes: a receiving module, configured to receive a policy and charging control (PCC) rule carrying a QoS requirement, packet filter information, and a reflective indication, the reflective indication for indicating that the reflective QoS applies for a service corresponding to the PCC rule; an association module, configured to associate the PCC rule having a same QoS requirement and including the reflective indication to a same QoS data flow, and assign a corresponding QoS flow identifier to each QoS data flow; a first transmitting module, configured to transmit a QoS flow identifier indication message to a user equipment (UE), the QoS flow identifier indication message carrying a QoS flow identifier of a service for which the reflective QoS applies, and the reflective indication information for indicating that the reflective applies for the QoS flow identifier, so that the UE determines, according to the QoS flow identifier indication message, a QoS flow identifier of a service for which the reflective QoS applies; and a second transmitting module, configured to transmit a configuration message of the service to a user plane function node (UPF), wherein the configuration message carries the packet filter information and the QoS flow identifier of the service, so that the UPF matches a downlink data packet of the service corresponding to the configuration message according to the packet filter information in the configuration message, and adds the QoS flow identifier in the configuration message to a packet header of the matched downlink data, so that when the UE receives a subsequent downlink data packet, the UE compares a QoS data flow identifier of the packet header of the subsequent downlink data packet and a QoS data flow identifier determined by the QoS flow identifier indication message, and determines whether to apply the reflective QoS for the service of the subsequent downlink data packet, and when the UE determines that the reflective QoS needs to be initiated for the service of the downlink data packet, the reflective QoS is applied for the service to obtain a QoS configuration of an uplink data packet of the service.

In yet another aspect, a session management function node (SMF), includes: a receiving module, configured to receive from a policy control function node (PCF) a policy and charging control (PCC) rule carrying a QoS requirement, packet filter information, and a reflective indication, wherein the reflective indication is used to indicate that reflective QoS applies for a service corresponding to the PCC rule; an association module, configured to associate the PCC rule having the same QoS requirement to a same QoS data flow, and assign a corresponding QoS flow identifier to each data flow; and a transmitting module, configured to transmit a configuration message of the service to a user plane function node (UPF), wherein the configuration message carries packet filter information and a QoS flow identifier of the service, and when the reflective QoS applies for the service, the configuration message further carries a reflective indication, so that the UFP matches a downlink data packet of the service corresponding to the configuration message according to the packet filter information in the configuration message, and adds a QoS flow identifier of the corresponding service to a packet header of the matched downlink data packet, and adds a reflective indication to the packet header of the downlink data packet when the downlink data packet belongs to the service for which the reflective QoS applies, so that a user equipment (UE) receives a subsequent downlink data packet, the UE determines to apply the reflective QoS on the received downlink data packet according to the reflective indication in the data packet header.

In yet another aspect, a user plane function node (UPF), includes: a receiving module, configured to receive a configuration message of a service from a session management function node (SMF), wherein the configuration message carries packet filter information and a QoS flow identifier of the service, the services having the same QoS requirement and for which reflective QoS applies have the same QoS flow identifier; a matching module, configured to match a downlink data packet of the service corresponding to the configuration message based on the packet filter information in the configuration message; an adding module, configured to add the QoS flow identifier of the service to a packet header of the matched downlink data packet; and a first transmitting module, configured to transmit the downlink data packet to a user equipment (UE).

Optionally, the UPF further includes: a first timing module, configured to start timing for the service corresponding to the downlink data packet when the downlink data packet is transmitted to the UE; a reset module, configured to control the first timing module to restart timing if other downlink data packets of the service are received before a time duration reaches a first time threshold; a first deleting module, configured to delete the packet filter information of the service if the service ends before the time duration reaches the first time threshold; and a simulation module, configured to generate a downlink data packet of the service by simulation when the timing duration reaches the first time threshold and if other downlink data packets of the service are not received and the service is not end, transmit the downlink data packet generated by the simulation to the UE, wherein the downlink data packet generated by the simulation and a downlink data packet that is in the same service and not generated by simulation have a same header.

Optionally, the UPF further includes: a second deleting module, configured to delete the packet filter information of the service when it is determined that the service corresponding to the downlink data packet ends; a second transmitting module, configured to generate an end indication data packet of the service when it is determined that the service corresponding to the downlink data packet ends and transmit the end indication data packet to the UE.

In yet another aspect, a user plane function node (UPF), includes: a receiving module, configured to receive a configuration message of a service from a session management function node (SMF), wherein the configuration message carries packet filter information and a QoS flow identifier of the service, when reflective QoS applies for the service, the configuration message further carries a reflective indication, services with the same QoS requirement have a same QoS flow identifier; a matching module, configured to match a downlink data packet of the service corresponding to the configuration message according to the packet filter information in the configuration message; an adding module, configured to add a QoS flow identifier of the corresponding service in the packet header of the downlink data packet, and adding the reflective indication in a packet header of the downlink data packet when the downlink data packet belongs to a service for which the reflective QoS applies; and a first transmitting module, configured to transmit the downlink data packet to the UE.

Optionally, the UPF further includes: a first timing module, configured to start timing for the service corresponding to the downlink data packet when the downlink data packet is transmitted to the UE; a reset module, configured to control the first timing module to restart timing if other downlink data packets of the service are received before a time duration reaches a first time threshold; a first deleting module, configured to delete the packet filter information of the service if the service ends before the time duration reaches the first time threshold; and a simulation module, configured to generate a downlink data packet of the service by simulation when the time duration reaches the first time threshold, if the other downlink data packets of the service are not received and the service is not end, and transmit the downlink data packet generated by simulation to the UE, wherein the downlink data packet generated by the simulation and a downlink data packet that is in the same service and not generated by simulation have a same header.

Optionally, the UPF further includes: a second deleting module, configured to delete the packet filter information of the service when the service corresponding to the downlink data packet is determined to end; and a second transmitting module, configured to generate an end indication data packet of the service and transmit the end indication data packet to UE when it is determined that the service corresponding to the downlink data packet ends.

In yet another aspect, a user equipment (UE), includes: a first receiving module, configured to receive a QoS flow identifier indication message from a session management function node (SMF), wherein the QoS flow identifier indication message carries a QoS flow identifier of a service for which the reflective QoS applies and a reflective indication message for indicating the reflective applies for the QoS flow identifier; a first determining module, configured to determine, according to the QoS flow identifier indication message, the QoS flow identifier for which the reflective QoS applies; a second receiving module, configured to receive a downlink data packet from a user plane function node (UPF), wherein a packet header of the downlink data packet carries a QoS flow identifier of the service; a second determining module, configured to determine whether to apply the reflective QoS for the service corresponding to the downlink data packet by comparing the QoS flow identifier carried in the downlink data packet and the determined QoS flow identifier for which the reflective QoS applies; a reflective module, configured to apply the reflective QoS when it is determined to apply the reflective QoS for the downlink data packet and determining QoS configuration of an uplink data packet that belongs to the same service as the downlink data packet; and a performing module, configured to perform the QoS configuration of the uplink data packet.

Optionally, the UE further includes: a timing module, configured to start timing when performing the QoS configuration of the uplink data packet; a reset module, configured to control the timing module to restart timing if the downlink data packet that belongs to the same service as the uplink data packet is received before the time duration reaches a second time threshold; a first stopping module, configured to control the execution module to stop performing the QoS configuration of the uplink data packet if the downlink data packet that belongs to the same service as the uplink data packet is not received when the time duration reaches the second time threshold.

Optionally, the UE further includes: a third receiving module, configured to receive an end indication data packet corresponding to the service of the uplink data packet sent by a user plane function node (UPF) during performing the QoS configuration of the uplink data packet; and a second stopping module, configured to control the execution module to stop performing the QoS configuration of the uplink data packet when the third receiving module has received the end indication data packet corresponding to the service of the uplink data packet sent by the user plane function node.

In yet another aspect, a user equipment (UE), includes: a receiving module, configured to receive a downlink data packet from a user plane function node (UPF), wherein the downlink data packet carries a QoS flow identifier of a service corresponding to the downlink data packet, and when the downlink data packet belongs to a service for which the reflective QoS applies, the downlink data packet further carries a reflective indication; a reflective module, configured to apply the reflective QoS when the downlink data packets carries the reflective indication, and determining QoS configuration of an uplink data packet that belongs to the same service as the downlink data packet; and a performing module, configured to perform the QoS configuration of the uplink data packet.

Optionally, the UE further includes: a timing module, configured to start timing when performing the QoS configuration of the uplink data packet; a reset module, configured to restart timing if the downlink data packet that belongs to the same service as the uplink data packet is received before the time duration reaches a second time threshold; a first stopping module, configured to control the performing module stop performing the QoS configuration of the uplink data packet if the downlink data packet that belongs to the same service as the uplink data packet is not received when the time duration reaches the second time threshold.

Optionally, the UE further includes: a second stopping module, configured to stop performing the QoS configuration of the uplink data packet when an end indication data packet corresponding to the service of the uplink data packet sent by the UFF during performing the QoS configuration of the uplink data packet is received.

In yet another aspect, a policy control function node (PCF) including a memory, a processor, and a computer program stored on the memory and executed by the processor, wherein the processor is configured to call and execute the program stored in the memory to implement following steps: determining a service for which a reflective QoS applies; and transmitting a policy and charging control (PCC) rule to a session management function node (SMF), wherein the PCC rule carries packet filter information, a QoS requirement, and a reflective indication of the service corresponding to the PCC rule, the reflective indication is used to indicate that the reflective QoS applies for the service corresponding to the PCC rule.

In yet another aspect, a computer readable storage medium storing therein a computer program, wherein the computer program is configured to be executed by a processor to implement following steps: determining a service for which a reflective QoS applies; and transmitting a policy and charging control (PCC) rule to a session management function node (SMF), wherein the PCC rule carries packet filter information, a QoS requirement, and a reflective indication of the service corresponding to the PCC rule, the reflective indication is used to indicate that the reflective QoS applies for the service corresponding to the PCC rule.

In yet another aspect, a session management function node (SMF) including a memory, a processor, and a computer program stored on the memory and executed by the processor, wherein the processor is configured to call and execute the program stored in the memory to implement following steps: receiving a policy and charging control (PCC) rule carrying a QoS requirement, packet filter information, and a reflective indication, the reflective indication for indicating that the reflective QoS applies for a service corresponding to the PCC rule; associating the PCC rule having a same QoS requirement and including the reflective indication to a same QoS data flow, and assigning a corresponding QoS flow identifier to each QoS data flow; transmitting a QoS flow identifier indication message to a user equipment (UE), the QoS flow identifier indication message carrying a QoS flow identifier of a service for which the reflective QoS applies, and the reflective indication information for indicating that the reflective applies for the QoS flow identifier, so that the UE determines, according to the QoS flow identifier indication message, a QoS flow identifier of a service for which the reflective QoS applies; and transmitting a configuration message of the service to a user plane function node (UPF), where the configuration message carries the packet filter information and the QoS flow identifier of the service, so that the UPF matches a downlink data packet of the service corresponding to the configuration message according to the packet filter information in the configuration message, and adds the QoS flow identifier in the configuration message to a packet header of the matched downlink data, so that when the UE receives a subsequent downlink data packet, the UE compares a QoS data flow identifier of the packet header of the subsequent downlink data packet and a QoS data flow identifier determined by the QoS flow identifier indication message, and determines whether to apply the reflective QoS for the service of the subsequent downlink data packet, and when the UE determines that the reflective QoS needs to be initiated for the service of the downlink data packet, the reflective QoS is applied for the service to obtain a QoS configuration of an uplink data packet of the service.

In yet another aspect, a computer readable storage medium storing therein a computer program, wherein the computer program is configured to be executed by a processor to implement following steps: receiving a policy and charging control (PCC) rule carrying a QoS requirement, packet filter information, and a reflective indication, the reflective indication for indicating that the reflective QoS applies for a service corresponding to the PCC rule; associating the PCC rule having a same QoS requirement and including the reflective indication to a same QoS data flow, and assigning a corresponding QoS flow identifier to each QoS data flow; transmitting a QoS flow identifier indication message to a user equipment (UE), the QoS flow identifier indication message carrying a QoS flow identifier of a service for which the reflective QoS applies, and the reflective indication information for indicating that the reflective applies for the QoS flow identifier, so that the UE determines, according to the QoS flow identifier indication message, a QoS flow identifier of a service for which the reflective QoS applies; and transmitting a configuration message of the service to a user plane function node (UPF), where the configuration message carries the packet filter information and the QoS flow identifier of the service, so that the UPF matches a downlink data packet of the service corresponding to the configuration message according to the packet filter information in the configuration message, and adds the QoS flow identifier in the configuration message to a packet header of the matched downlink data, so that when the UE receives a subsequent downlink data packet, the UE compares a QoS data flow identifier of the packet header of the subsequent downlink data packet and a QoS data flow identifier determined by the QoS flow identifier indication message, and determines whether to apply the reflective QoS for the service of the subsequent downlink data packet, and when the UE determines that the reflective QoS needs to be initiated for the service of the downlink data packet, the reflective QoS is applied for the service to obtain a QoS configuration of an uplink data packet of the service.

In yet another aspect, a session management function node (SMF) including a memory, a processor, and a computer program stored on the memory and executed by the processor, wherein the processor is configured to call and execute the program stored in the memory to implement following steps: receiving from a policy control function node (PCF) a policy and charging control (PCC) rule carrying a QoS requirement, packet filter information, and a reflective indication, wherein the reflective indication is used to indicate that reflective QoS applies for a service corresponding to the PCC rule; associating the PCC rule having the same QoS requirement to a same QoS data flow, and assigning a corresponding QoS flow identifier to each data flow; and transmitting a configuration message of the service to a user plane function node (UPF), wherein the configuration message carries packet filter information and a QoS flow identifier of the service, and when the reflective QoS applies for the service, the configuration message further carries a reflective indication, so that the UFP matches a downlink data packet of the service corresponding to the configuration message according to the packet filter information in the configuration message, and adds a QoS flow identifier of the corresponding service to a packet header of the matched downlink data packet, and adds a reflective indication to the packet header of the downlink data packet when the downlink data packet belongs to the service for which the reflective QoS applies, so that a user equipment (UE) receives a subsequent downlink data packet, the UE determines to apply the reflective QoS on the received downlink data packet according to the reflective indication in the data packet header.

In yet another aspect, a computer readable storage medium storing therein a computer program, wherein the computer program is configured to be executed by a processor to implement following steps: receiving from a policy control function node (PCF) a policy and charging control (PCC) rule carrying a QoS requirement, packet filter information, and a reflective indication, wherein the reflective indication is used to indicate that reflective QoS applies for a service corresponding to the PCC rule; associating the PCC rule having the same QoS requirement to a same QoS data flow, and assigning a corresponding QoS flow identifier to each data flow; and transmitting a configuration message of the service to a user plane function node (UPF), wherein the configuration message carries packet filter information and a QoS flow identifier of the service, and when the reflective QoS applies for the service, the configuration message further carries a reflective indication, so that the UFP matches a downlink data packet of the service corresponding to the configuration message according to the packet filter information in the configuration message, and adds a QoS flow identifier of the corresponding service to a packet header of the matched downlink data packet, and adds a reflective indication to the packet header of the downlink data packet when the downlink data packet belongs to the service for which the reflective QoS applies, so that a user equipment (UE) receives a subsequent downlink data packet, the UE determines to apply the reflective QoS on the received downlink data packet according to the reflective indication in the data packet header.

In yet another aspect, a user plane function node (UPF), including a memory, a processor, and a computer program stored on the memory and executed by the processor, wherein the processor is configured to call and execute the program stored in the memory to implement following steps: receiving a configuration message of a service from a session management function node (SMF), wherein the configuration message carries packet filter information and a QoS flow identifier of the service, the services having the same QoS requirement and for which reflective QoS applies have the same QoS flow identifier; matching a downlink data packet of the service corresponding to the configuration message based on the packet filter information in the configuration message; adding the QoS flow identifier of the service to a packet header of the matched downlink data packet; and transmitting the downlink data packet to a user equipment (UE).

In yet another aspect, a computer readable storage medium storing therein a computer program, wherein the computer program is configured to be executed by a processor to implement following steps: receiving a configuration message of a service from a session management function node (SMF), wherein the configuration message carries packet filter information and a QoS flow identifier of the service, the services having the same QoS requirement and for which reflective QoS applies have the same QoS flow identifier; matching a downlink data packet of the service corresponding to the configuration message based on the packet filter information in the configuration message; adding the QoS flow identifier of the service to a packet header of the matched downlink data packet; and transmitting the downlink data packet to a user equipment (UE).

In yet another aspect, a user plane function node (UPF), including a memory, a processor, and a computer program stored on the memory and executed by the processor, wherein the processor is configured to call and execute the program stored in the memory to implement following steps: receiving a configuration message of a service from a session management function node (SMF), wherein the configuration message carries packet filter information and a QoS flow identifier of the service, when reflective QoS applies for the service, the configuration message further carries a reflective indication, services with the same QoS requirement have a same QoS flow identifier; matching a downlink data packet of the service corresponding to the configuration message according to the packet filter information in the configuration message; adding a QoS flow identifier of the corresponding service in the packet header of the downlink data packet, and adding the reflective indication in a packet header of the downlink data packet when the downlink data packet belongs to a service for which the reflective QoS applies; and transmitting the downlink data packet to the UE.

In yet another aspect, a computer readable storage medium storing therein a computer program, wherein the computer program is configured to be executed by a processor to implement following steps: receiving a configuration message of a service from a session management function node (SMF), wherein the configuration message carries packet filter information and a QoS flow identifier of the service, when reflective QoS applies for the service, the configuration message further carries a reflective indication, services with the same QoS requirement have a same QoS flow identifier; matching a downlink data packet of the service corresponding to the configuration message according to the packet filter information in the configuration message; adding a QoS flow identifier of the corresponding service in the packet header of the downlink data packet, and adding the reflective indication in a packet header of the downlink data packet when the downlink data packet belongs to a service for which the reflective QoS applies; and transmitting the downlink data packet to the UE.

In yet another aspect, a user equipment (UE), including a memory, a processor, and a computer program stored on the memory and executed by the processor, wherein the processor is configured to call and execute the program stored in the memory to implement following steps: receiving a QoS flow identifier indication message from a session management function node (SMF), wherein the QoS flow identifier indication message carries a QoS flow identifier of a service for which the reflective QoS applies and a reflective indication message for indicating the reflective applies for the QoS flow identifier; determining, according to the QoS flow identifier indication message, the QoS flow identifier for which the reflective QoS applies; receiving a downlink data packet from a user plane function node (UPF), wherein a packet header of the downlink data packet carries a QoS flow identifier of the service; determining whether to apply the reflective QoS for the service corresponding to the downlink data packet by comparing the QoS flow identifier carried in the downlink data packet and the determined QoS flow identifier for which the reflective QoS applies; applying the reflective QoS when it is determined to apply the reflective QoS for the downlink data packet and determining QoS configuration of an uplink data packet that belongs to the same service as the downlink data packet; and performing the QoS configuration of the uplink data packet.

In yet another aspect, a computer readable storage medium storing therein a computer program, wherein the computer program is configured to be executed by a processor to implement following steps: receiving a QoS flow identifier indication message from a session management function node (SMF), wherein the QoS flow identifier indication message carries a QoS flow identifier of a service for which the reflective QoS applies and a reflective indication message for indicating the reflective applies for the QoS flow identifier; determining, according to the QoS flow identifier indication message, the QoS flow identifier for which the reflective QoS applies; receiving a downlink data packet from a user plane function node (UPF), wherein a packet header of the downlink data packet carries a QoS flow identifier of the service; determining whether to apply the reflective QoS for the service corresponding to the downlink data packet by comparing the QoS flow identifier carried in the downlink data packet and the determined QoS flow identifier for which the reflective QoS applies; applying the reflective QoS when it is determined to apply the reflective QoS for the downlink data packet and determining QoS configuration of an uplink data packet that belongs to the same service as the downlink data packet; and performing the QoS configuration of the uplink data packet.

In yet another aspect, a user equipment (UE), including a memory, a processor, and a computer program stored on the memory and executed by the processor, wherein the processor is configured to call and execute the program stored in the memory to implement following steps: receiving a downlink data packet from a user plane function node (UPF), wherein the downlink data packet carries a QoS flow identifier of a service corresponding to the downlink data packet, and when the downlink data packet belongs to a service for which the reflective QoS applies, the downlink data packet further carries a reflective indication; applying the reflective QoS when the downlink data packets carries the reflective indication, and determining QoS configuration of an uplink data packet that belongs to the same service as the downlink data packet; and performing the QoS configuration of the uplink data packet.

In yet another aspect, a computer readable storage medium storing therein a computer program, wherein the computer program is configured to be executed by a processor to implement following steps: receiving a downlink data packet from a user plane function node (UPF), wherein the downlink data packet carries a QoS flow identifier of a service corresponding to the downlink data packet, and when the downlink data packet belongs to a service for which the reflective QoS applies, the downlink data packet further carries a reflective indication; applying the reflective QoS when the downlink data packets carries the reflective indication, and determining QoS configuration of an uplink data packet that belongs to the same service as the downlink data packet; and performing the QoS configuration of the uplink data packet.

The present disclosure has the beneficial effects as follows. In a QoS control method, for the service for which the reflective applies, a PCF adds a reflective indication in a PCC rule. If the reflective QoS is based on a control plane, a SMF aggregates services for which the reflective QoS applies and does not apply in different data flows, and a UE may determine the service for which the reflective QoS applies based on QFI. If the reflective QoS is based on a user plane, a SMF aggregates services having a same QoS requirement in a same data flow, and configures a reflective indication to the service for which the reflective QoS applies, and the UE may apply the reflective QoS based on the reflective indication in the data packet. The disclosure aims to solve the problem in the related art of the aggregation of service data flows after introducing a reflective strategy, and how to ensure the UE to apply the reflective QoS properly according to the instruction from the network and generate the uplink QoS rule.

BRIEF DESCRIPTION OF THE DRAWINGS

In order to more clearly illustrate the technical solutions of the embodiments of the present disclosure, the drawings used in the description of the embodiments of the present disclosure will be briefly described. It is obvious that the drawings in the following description are only some embodiments of the present disclosure. Other drawings may also be obtained from those of ordinary skill in the art in view of the drawings.

DETAILED DESCRIPTION

The technical solutions of the embodiments of the present disclosure will be clearly and completely described below in conjunction with the drawings of the embodiments of the present disclosure. It is apparent that the described embodiments are part of the embodiments of the present disclosure, and not all of the embodiments. All other embodiments obtained by those of ordinary skill in the art based on the described embodiments of the present disclosure are within the scope of the disclosure.

Figure 1:
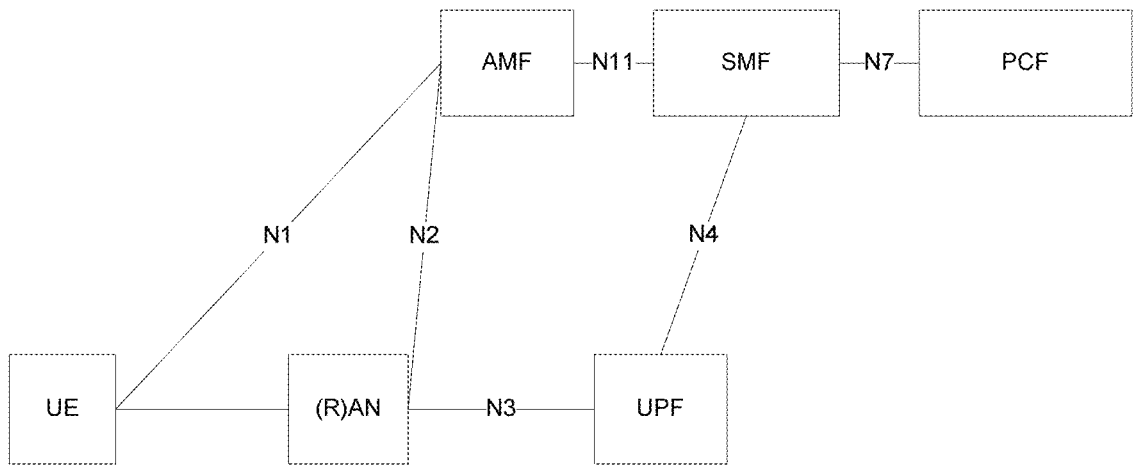
FIG. 1 is a schematic diagram of a 5G network architecture in the related art.

The current 5G network architecture is shown in FIG. 1. UPF (User Plane Function) represents a user plane function node, AMF (Access and Mobility Management Function), and SMF (Session Management Function) represents a session management function control node. AMF is responsible for mobility management and is connected to the UE and an Access Network (AN). SMF is responsible for session management and is connected to the UPF. PCF (Policy Control Function) represents a policy control function node, PCF is responsible for policy control.

The SMF receives a PCC rule of Service Data Function (SDF) data flow level from the PCF. The SMF aggregates different PCC rules according to the QoS requirements, and the PCC rules with the same QoS requirements are aggregated to a same QoS data stream, and a QoS Flow ID (QFI) is assigned to this QoS data stream. The SMF sends the packet filter information and the corresponding QFI to the UPF. After receiving the downlink data, the UPF uses the data matching packet filter to match the IP header of the received downlink data, and tags a corresponding QFI to the matched data packet. The data is sent to the AN through an N3 tunnel, and the AN sends the data packets to UE by using a corresponding radio bearer according to the QFI, so as to ensure that the data packet obtains the corresponding QoS.

In addition, the SMF also sends the QoS rule including the packet filter information and the corresponding QFI to the UE, so that the UE can transmit uplink data by using a correct radio bearer according to the QoS rule. When the service ends, the SMF receives an indication to delete the PCC rule from the PCF, and instructs the UPF and the UE to delete the corresponding packet filter information.

In the related art, a corresponding QoS may be provided to the service whose packet filter information does not change frequently according to the operator's policy, and a radio bearer having a corresponding QoS may be selected for transmission. However, if the reflective policy technology is used to support a service in which data streams have a large number of non-continuous IP addresses or a frequently changed IP address, it needs to consider how to aggregate the service data flow and indicate to the UE, so that the UE can perform reflective and generate a correct QoS rule for the uplink data.

The purpose of the present disclosure is to provide a reflective solution, which solves the problem of the aggregation of service data flows after the introduction of the reflective policy technology in the QoS control mechanism in the related art, and the problems how to ensure the UE to correctly perform reflective QoS to generate an uplink QoS rule according to the instruction of network, and ensure the UE to delete the self-generated QoS rule after the end of the service. According to the solution of the present disclosure, it may be ensured that the UE can correctly perform the reflective QoS under the control of the network, generate and delete the QoS configuration, so that the 5G network can support the Internet service.

Figure 2:
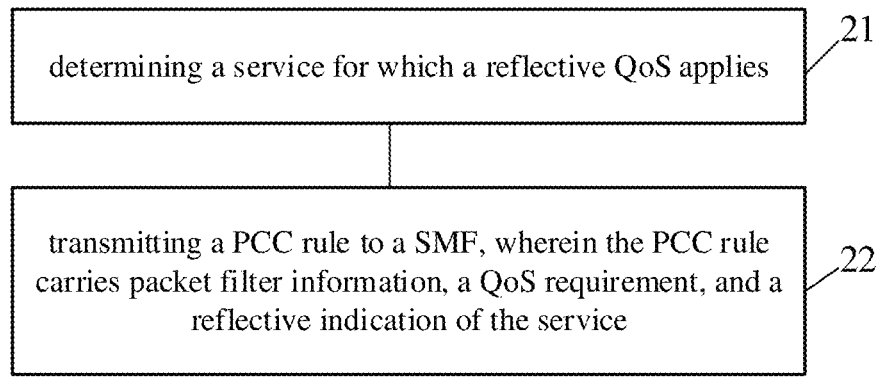
FIG. 2 is a flow chart of a QoS control method on a PCF side according to an embodiment of the present disclosure.

As shown in FIG. 2, the embodiment of the present disclosure provides a QoS control method applied to the PCF, includes the following steps.

Step 21: determining a service for which a reflective QoS applies.

With the development of the current communication system, the services have diversity, data streams of many services (such as Internet services) may need to change IP addresses or have multiple non-continuous IP addresses. For this kind of service, the QoS rule indication signaling needs to be initiated corresponding to different IP addresses for the downlink data packet and the uplink data packet, thus a large overhead is generated. To solve this problem, this embodiment can initiate a reflective QoS for this kind of service.

That is, in this step, the PCF determines the service in which the IP address of the data stream is changed as a service in which a reflective applies for the QoS; and/or the PCF determines a service in which the data stream has a discontinuous IP address and the number of discontinuous IP addresses is greater than a preset threshold as a service in which a reflective applies for the QoS.

The preset threshold may be set according to an actual situation. As an example, when the data flow of the service has discontinuous IP addresses whose quantity is greater than 3, a large load is generated on the network, and the preset threshold may be 3.

In addition, in practical applications, the PCF can determine whether the IP address needs to be changed according to a type and/or identity of the service, and the PCF itself has the function of determining discontinuous IP addresses of the service data stream.

Step 22: transmitting a policy and charging control (PCC) rule to a session management function node (SMF), wherein the PCC rule carries packet filter information, a QoS requirement, and a reflective indication of the service corresponding to the PCC rule, the reflective indication is used to indicate that the reflective QoS applies for the service corresponding to the PCC rule.

In this embodiment, the PCC rule in the related art is used to carry the reflective indication of the service, and the different services have respective PCC rules, and the SMF can determine the service corresponding to the PCC rule, if the PCC rule carries the reflective indication, it is further determined that the reflective QoS applies for the service.

After the PCC rule is sent, the SMF performs reflective QoS control on a downstream node according to the indication of the PCC rule.

The following describes the QoS control method of reflective in combination with two implementation modes.

One of the implementation methods is based on the control of the 5G network on the reflective QoS of the service.

That is, after receiving the PCC rule including the reflective indication from the PCF, the SMF aggregates the services corresponding to the PCC rule according to the QoS service requirement and the reflective indication.

In a specific aggregation process, the SMF aggregates the services which have the same QoS service requirements and to which the reflective applies into a same QoS data flow, and allocates QFI for the QoS data flow, and the services to which the reflective does not apply are aggregated into other QoS data flow, and other QFIs are assigned to the services, thereby enabling QFI to be an indication to distinguish whether to apply the reflective QoS.

The SMF sends the QFI indicating that the reflective applies to the UE, so that the UE compares the QFI with a QFI in a downlink packet header which is subsequently received, determines whether to apply the reflective QoS, and generates the QoS configuration of the uplink data packet.

A reflective QoS scheme in the control plane is described in detail below.

Figure 3A:
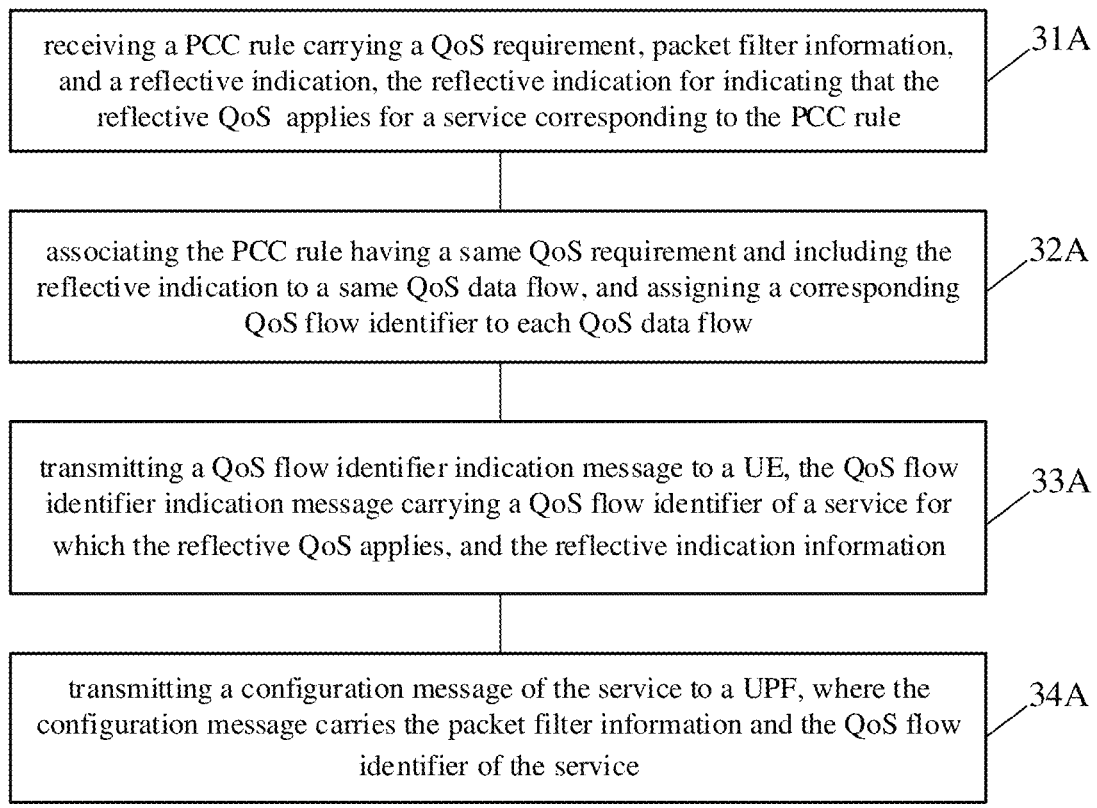
FIG. 3A and FIG. 3B are flow charts of a QoS control method on an SMF side according to an embodiment of the present disclosure.

As shown in FIG. 3A, the QoS control method on the SMF side includes the following steps.

Step 31A: receiving a PCC rule carrying the QoS requirement, the packet filter information, and the reflective indication from the policy control function node. The reflective indication is used to indicate that the reflective QoS applies for a service corresponding to the PCC rule.

Step 32A: associating the PCC rule having the same QoS requirements and including the reflective indication to a same QoS data flow, and assigning a corresponding QoS flow identifier to each QoS data flow. Obviously, in this step, the service to which the reflective is applied for QoS and the service to which the reflective is not applied for QoS can be distinguished by using the QoS flow identifier. Therefore, the QoS flow identifier can be used to determine to which services the reflective applies for the QoS. That is, the QoS flow identifier has a function of indicating whether to apply the reflective to the service.

Step 33A: transmitting a QoS flow identifier indication message to the UE, the QoS flow identifier indication message carrying a QoS flow identifier of a service for which the reflective QoS applies, and the reflective indication information for indicating that the reflective applies for the QoS flow identifier, so that the UE determines, according to the QoS flow identifier indication message, a QoS flow identifier of a service for which the reflective QoS applies.

Step 34A: transmitting a configuration message of the service to the user plane function node (that is, the UPF in FIG. 1), where the configuration message carries the packet filter information and the QoS flow identifier of the service, so that the user plane function node can match the downlink data packet of the service corresponding to the configuration message according to the packet filter information in the configuration message, and add the QoS flow identifier in the configuration message to the packet header of the matched downlink data, so that when the UE receives subsequent downlink data packet, the UE compares a QoS data flow identifier of the packet header of the downlink data packet with a QoS data flow identifier determined by the QoS flow identifier indication message, and determines whether to apply the reflective QoS for the downlink data packet service, and when the UE determines that the reflective QoS needs to be initiated for the service of the downlink data packet, the reflective QoS is applied for the service to obtain a QoS configuration of the uplink data packet of the service.

In this step, the SMF sends a configuration message to inform the UPF UPF of the QoS flow identifier assigned by the SMF to enable the UPF to perform a current function, and adds the allocated QoS flow identifier to the header of the downlink data packet of the corresponding service. In addition, since the QoS flow identifier itself can indicate whether to apply the reflective to its service, the UPF can also determine the service to which the reflective applies for the QoS according to the configuration information.

Figure 4A:
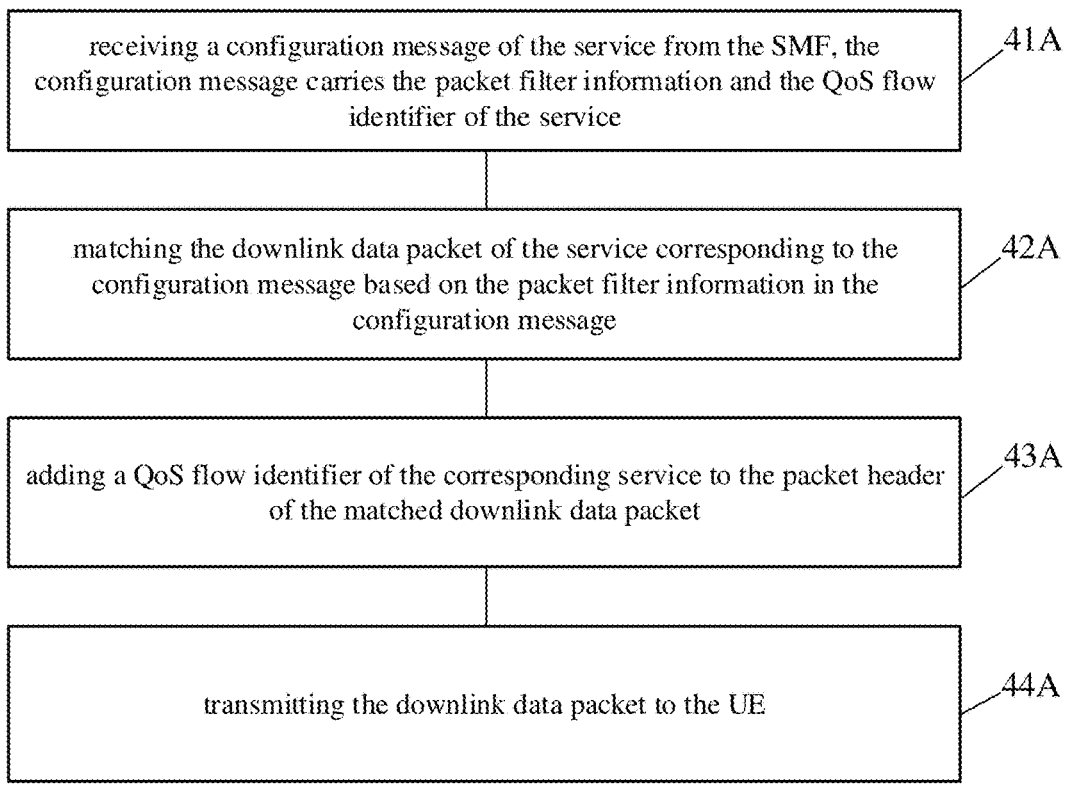
FIG. 4A and FIG. 4B are flow charts of a QoS control method on a UPF side according to an embodiment of the present disclosure.

Correspondingly, as shown in FIG. 4A, the QoS control method on the control plane at the UPF side includes the following steps.

Step 41A: receiving a configuration message of the service from the SMF. According to the above description, the configuration message carries the packet filter information and the QoS flow identifier of the service, and the services having the same QoS requirement and for which the reflective QoS applies have the same QoS flow identifier.

Step 42A: matching the downlink data packet of the service corresponding to the configuration message based on the packet filter information in the configuration message. In this step, the UPF receives the configuration message, and locally buffer the service, the packet filter information, the QoS flow identifier, and the corresponding relationship thereof. After receiving the downlink data packet, the UPF can match a corresponding service and QoS flow identifier according to the packet filter information of the downlink data packet.

Step 43A: adding a QoS flow identifier of the corresponding service to the packet header of the matched downlink data packet.

Step 44A: transmitting the downlink data packet to the UE, so that the UE determines whether to perform reflective according to the QoS flow identifier of the packet header in the downlink data packet.

Figure 5A:
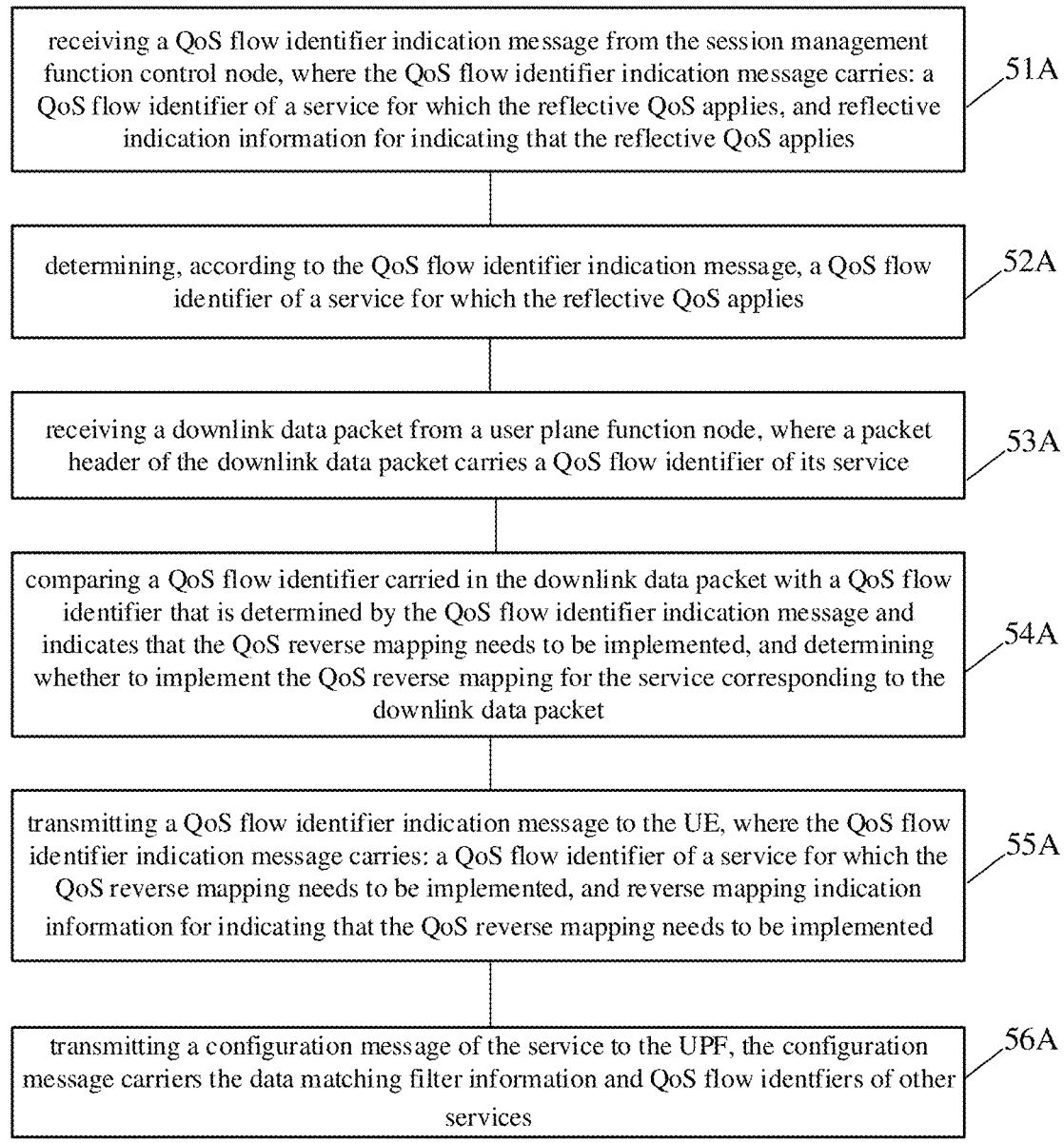
FIG. 5A and FIG. 5B are flow charts of a QoS control method on a UE side according to an embodiment of the present disclosure.

Correspondingly, as shown in FIG. 5A, the QoS control method on the control plane at the UE side includes the following steps.

Step 51A: receiving a QoS flow identifier indication message from the session management function control node, where the QoS flow identifier indication message carries: a QoS flow identifier of a service for which the reflective QoS applies, and reflective indication information for indicating that the reflective QoS applies.

Step 52A: determining, according to the QoS flow identifier indication message, a QoS flow identifier of a service for which the reflective QoS applies.

Step 53A: receiving a downlink data packet from a user plane function node, where a packet header of the downlink data packet carries a QoS flow identifier of its service;

Step 54A: comparing a QoS flow identifier carried in the downlink data packet with a QoS flow identifier that is determined by the QoS flow identifier indication message and indicates that the reflective QoS applies, and determining whether to apply the reflective QoS for the service corresponding to the downlink data packet.

Step 55A: applying the reflective QoS if it is determined that the reflective QoS applies for the downlink data packet, and determining a QoS configuration of an uplink data packet belonging to a same service as the downlink data packet.

Step 56A: performing the QoS configuration for the determined uplink data packet.

Obviously, based on the reflective QoS process on the control plane of the present disclosure, the UE can determine whether to initiate reflective QoS according to the QFI of the downlink data packet, and if yes, generate a QoS configuration of the uplink data packet of the corresponding service. Therefore, it is not necessary to request the network side so as to reduce the signaling burden on the network side.

Further, after initiating the reflective QoS, the UE needs to end the QoS configuration of the determined uplink data packet. The reflective QoS method on the control plane has two implementation modes.

In the first implementation mode, a timer is enabled to automatically end the reflective QoS. That is, at the UPF side, when the UPF transmits the downlink data packet to the UE, timing is started for the service corresponding to the downlink data packet.

If other downlink packets of the service are received before the time duration reaches the first time threshold, the timing is restarted. Before the time duration reaches the first time threshold, if the service ends (in the related art, the PCF notifies the SMF the end of the service, then the SMF notifies the UPF), the packet filter information corresponding to the service is deleted.

When the timing duration reaches the first time threshold, if other downlink data packets of the service are not received (it may be determined by the packet filter information, that is, the downlink data packet having a same packet filter information as the service is not received), and the service is not end, a downlink data packet of the service is generated by simulation, and the downlink data packet generated by the simulation is transmitted to the UE. The downlink data packet generated by the simulation and a downlink data packet that is in the same service and not generated by simulation have a same header.

Correspondingly, at the UE side, the timing is started when the UE performs the QoS configuration of the determined uplink data packet. If the downlink data packet belonging to the same service as the uplink data packet is received before the time duration reaches the second time threshold, the timing is restarted. If the downlink data packet belonging to the same service as the uplink data packet is not received when the time duration reaches the second time threshold, the QoS configuration of the uplink data packet is stopped.

Obviously, based on the above description, the reflective QoS method on the control plane starts the timer at the same time at the UPF side and the UE side. The UE side does not know when the service ends, during the timing process, when the UE receives a downlink data packet of a service for which the reflective applies, the timing will be restarted for the service and the service is regard as not finished yet. If the timing reaches the second threshold successfully, it indicates that the transmission of the downlink data packet of the service is finished, and the service is end.

At the UPF side, since the SMF notification will be received at the end of the service, the UPF side knows when the service ends. If there is no downlink data packet of the service for which the reflective QoS applies to be transmitted to the UE before the end of the service, in order to avoid the case that UE determines the end of the service by mistake when the timing reaches the second preset time threshold, the UPF side can transmit a downlink data packet generated by simulation of the service to the UE, so that the UE restarts timing based on the downlink data packet generated by simulation, so as to ensure that the QoS configuration by the reflective can operate normally.

In the second implementation mode, the UPF side directly informs the UE of the end of the service by an indication, and the UE determines the end of the service according to the indication, thereby stopping performing the QoS configuration on the uplink data packet for the service.

That is, at the UPF side, when it is determined that the reflective QoS needs to be completed, the packet filter information of the service is deleted, and an end indication data packet of the service is transmitted to the UE.

At the UE side, if the end indication data packet of the service of the uplink data packet sent by the UPF is received during performing the QoS configuration of the uplink data packet, the QoS configuration of the uplink data packet is stopped.

The following describes the reflective QoS method on the control plane in detail in combination with the actual application.

Figure 6:
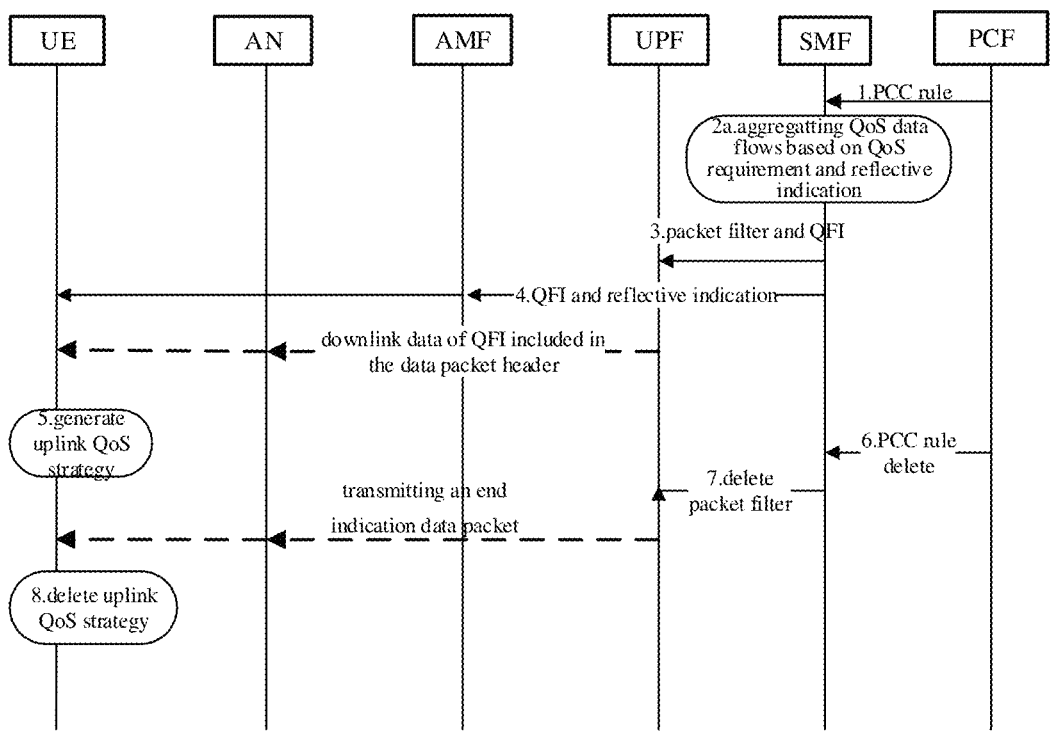
FIG. 6 is a detailed flowchart of a QoS control method based on a control plane according to an embodiment of the present disclosure.
Figure 7:
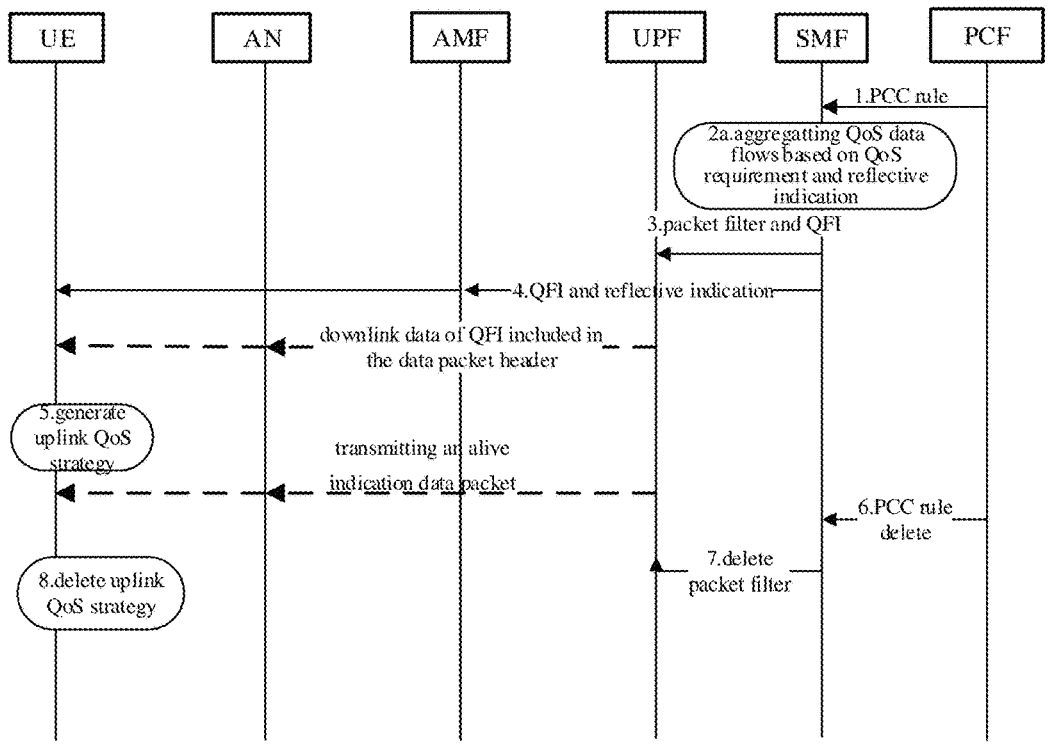
FIG. 7 is a detailed flowchart of a QoS control method based on a user plane according to an embodiment of the present disclosure.

As shown in FIG. 6, the reflective QoS method on the control plane includes the following steps.

Step 1: determining, by the PCF, that the reflective QoS applies for a service when the service is started. For example, the IP address of the data flow of the service changes frequently, for a service for which the reflective QoS applies, the PCF adds a reflective indication in the corresponding PCC rule and transmit the same to the SMF. The PCC rule includes an IP address of the service data flow, and QoS requirements such as 5QI (5G QoS Indicator) and ARP (Allocation and Retention Priority), and the reflective indication.

Step 2: aggregating, by the SMF, services having the same QoS service requirement and for which the reflective applies in a same QoS data flow, and assigning a QFI for the QoS data flow, and aggregating services for which the reflective does not apply in another QoS data flow. That is, the service for which the reflective applies and the service for which the reflective does not apply are not aggregated in the same QoS data flow.

Step 3: transmitting, by the SMF, the packet filter information and the corresponding QFI of the service to the UPF. After receiving the downlink data, the UPF matches the downlink data packet according to the packet filter information, and adds the QFI to the packet header of the matched downlink data packet, and sends the QFI to the UE through the AN. Here, the AN performs the corresponding QoS configuration according to the QFI in the downlink data packet header. Since the present disclosure does not improve the AN side, the AN side is described in detail.

Step 4: transmitting, by the SMF, the QoS flow identifier indication message (carrying the QFI of the service for which the reflective QoS applies, and the reflective indication information for indicating the reflective applies for the QFI) to the UE, to indicate the UE to apply the reflective QoS for data of the QoS data stream corresponding to the QFI in the QoS flow identifier indication message.

Step 5: determining, by the UE, after receiving the downlink data, the reflective QoS applies for the data packet according to the instruction in Step 4 and the QFI of the data packet header. If it is determined that the reflective QoS applies, the UE applies the reflective according to the IP header and QFI of the downlink data packet, and generates the QoS policy for the uplink data.

Step 6: instructing, by the PCF, the SMF to delete the PCC rule when the service ends.

Step 7: instructing, by the SMF, the UPF to delete the corresponding packet filter information, and deleting, by the UPF, the packet filter and transmitting an end indication data packet of the service to the UE.

Step 8: deleting, by the UE, the uplink QoS rule generated by itself according to the received end indication data packet.

Second Practical Application

In the second practical application, steps 1-5 are the same as the above practical application. The difference is that the UE starts a timer for a generated uplink QoS rule, and the UPF also keeps a synchronized timer, for example, a default timer value. For a specific packet filter, the UPF restarts the timer every time a downlink data matching the packet filter information is transmitted, and when the UE receives the first downlink data packet, the UE generates a corresponding uplink QoS rule including the packet filter for reflective QoS. When the UE receives the corresponding downlink data again, the UE restarts a timer of the uplink QoS rule. When the timer expires, the UE deletes the uplink QoS rule. Before the UPF receives an indication from the SMF for deleting the packet filter due to the end of the service, if the UE still does not receive the downlink data packet of the packet filter at a specific time just before the timer expires (for example, 1 second before the timer expires), the UE generates one or more alive indication data packets matching the packet filter by simulation and sent the same to the UE, and the IP packet header of the alive indication data packet is the same as the downlink data packet received from the UPF and matching the packet filter. After receiving the data packet, the UE restarts the timer corresponding to the uplink QoS rule, and keep the uplink QoS configuration generated by the UE side alive.

Step 6: instructing, by the PCF, the SMF to delete the PCC rule when the service ends.

Step 7: instructing, by the SMF, the UPF to delete the corresponding packet filter information.

Step 8: determining, by the UE, that the service of the downlink data packet has ended after the timer expires and the UE does not receive the downlink data packet of a reflective task, and deleting the corresponding uplink QoS rule generated by the UE.

Compared with the above QoS control scheme on the control plane, another implementation is based on the control of the reflective QoS for the service on the user plane of the 5G network.

That is, after the SMF receives the PCC rule including the reflective indication from the PCF, if the reflective QoS based on the user plane mode is adopted, the SMF aggregates the services of the same QoS service requirement into the same QoS data flow, and assign a QFI to the QoS data flow.

If the implementation is not used for the control plane, the QFI cannot distinguish the services for which the reflective QoS applies, and it is necessary to add a reflective indication separately. The SMF sends the packet filter information of the service, the corresponding QFI and the reflective indication to the UPF. After receiving the downlink data, the UPF adds a QFI and a reflective indication to the packet header of the matched data packet according to the packet filter, and sends the same to the UE. The UE determines that the reflective QoS needs to be performed based on the reflective indication in the packet header of the downlink data packet, and generates a QoS configuration of the uplink data packet accordingly.

The reflective QoS scheme on the user plane is described in detail below.

Figure 3B:
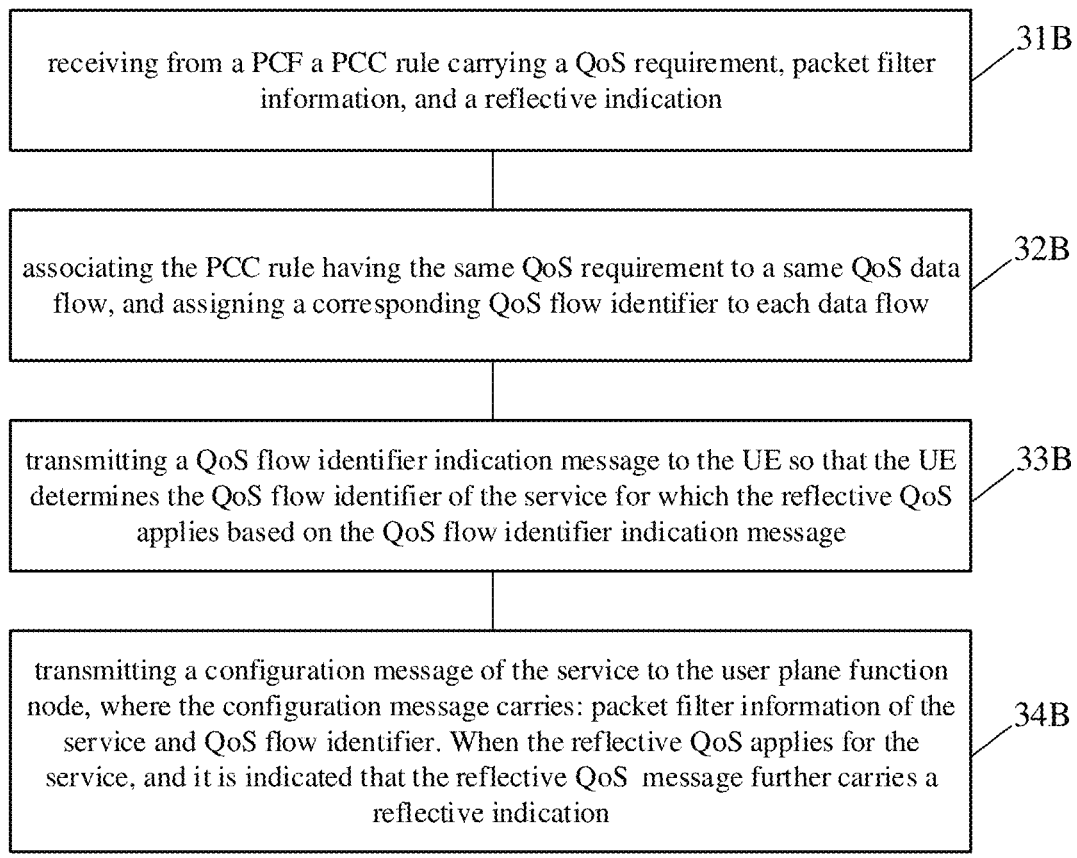

As shown in FIG. 3B, the QoS control method at the SMF side include the following steps.

Step 31B: receiving from the policy control function node a PCC rule carrying the QoS requirement, the packet filter information, and the reflective indication, where the reflective indication is used to indicate that the reflective QoS applies for the service corresponding to the PCC rule.

Step 32B: associating the PCC rule having the same QoS requirements to a same QoS data flow, and assigning a corresponding QoS flow identifier to each QoS data flow.

Step 33B: transmitting a configuration message of the service to the user plane function node, where the configuration message carries: packet filter information and QoS flow identifier of the service. When the reflective QoS applies for the service, and it is indicated that the reflective QoS message further carries a reflective indication, so that the user plane function node can match the downlink data packet of the service corresponding to the configuration message according to the packet filter information in the configuration message, and adds the QoS flow identifier of the corresponding service to the packet header of the matched downlink data packet. When the downlink data packet belongs to the service for which the reflective QoS applies, a reflective indication is added to the packet header of the downlink data packet, so that when the UE subsequently receives a downlink data packet, the UE determines that the reflective QoS applies for the received downlink data packet according to the reflective indication of the data packet header.

Figure 4B:
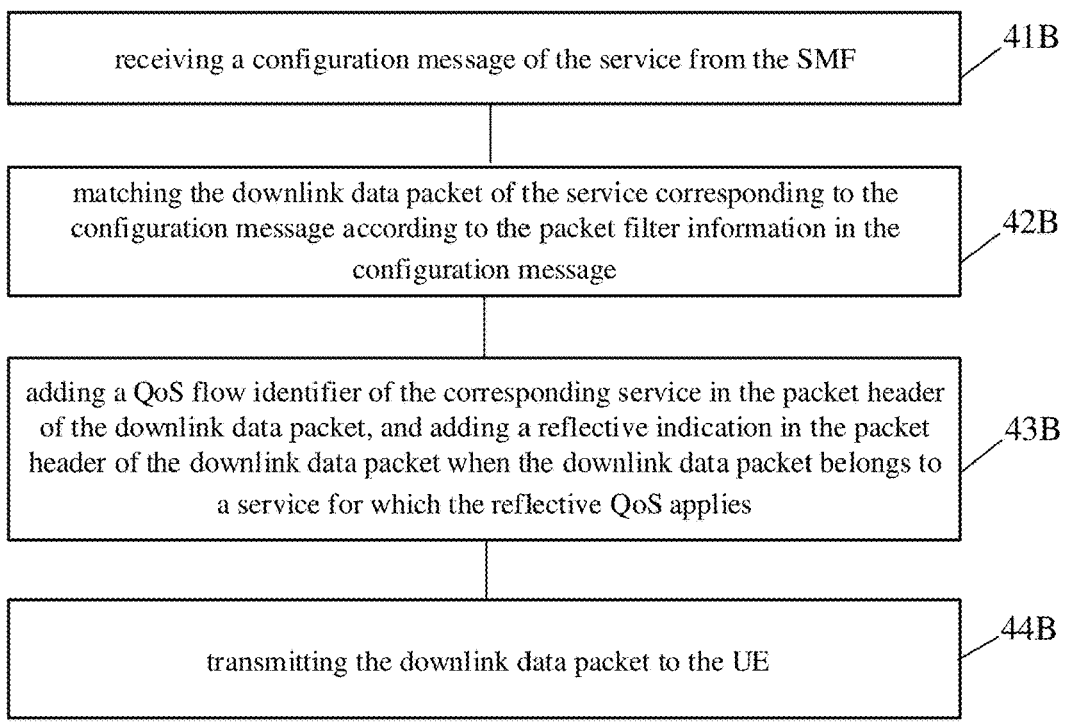

Correspondingly, as shown in FIG. 4B, the QoS control method on the user plane at the UPF side includes the following steps.

Step 41B: receiving a configuration message of the service from the SMF, where the configuration message carries the packet filter information and the QoS flow identifier of the service, and when the reflective QoS applies for the service, the configuration message further carries a reflective indication, wherein services having the same QoS requirement have the same QoS flow identifier.

Step 42B: matching the downlink data packet of the service corresponding to the configuration message according to the packet filter information in the configuration message.

Step 43B: adding a QoS flow identifier of the corresponding service in the packet header of the downlink data packet, and adding a reflective indication in the packet header of the downlink data packet when the downlink data packet belongs to a service for which the reflective QoS applies. Therefore, when the UE subsequently receives the downlink data packet, the UE determines to apply the reflective QoS on the received downlink data packet according to the reflective indication of the data packet header.

Step 44B: transmitting the downlink data packet to the UE.

Figure 5B:
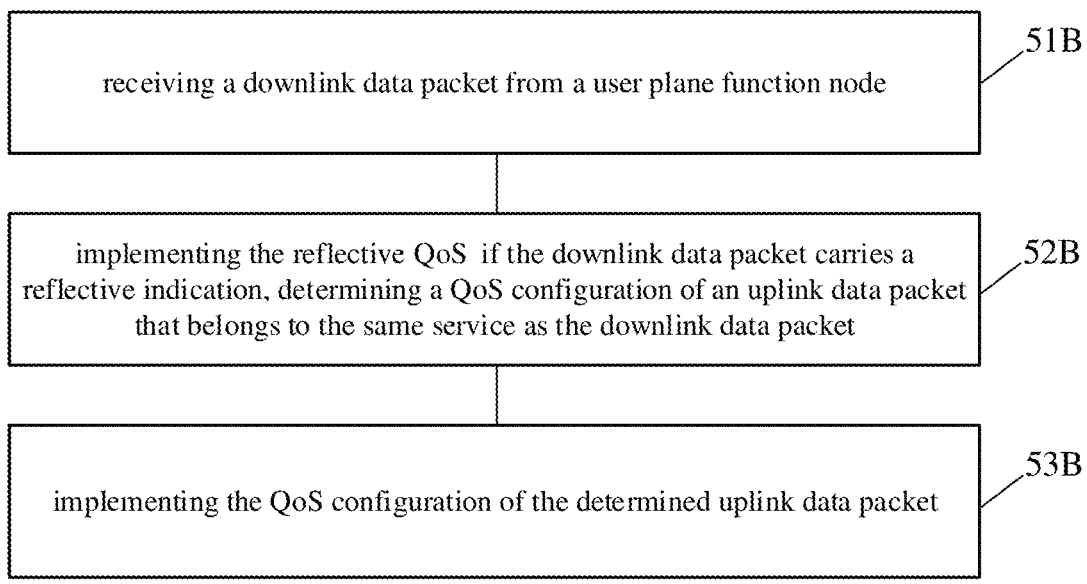

Correspondingly, as shown in FIG. 5B, the QoS control method on the user plane at the UE side includes the following steps.

Step 51B: receiving a downlink data packet from a user plane function node, where the downlink data packet carries a QoS flow identifier of a service corresponding to the downlink data packet, and when the downlink data packet belongs to a service for which the reflective QoS applies, the downlink data packet further carries a reflective indication.

Step 52B: applying the reflective QoS if the downlink data packet carries a reflective indication, determining a QoS configuration of an uplink data packet that belongs to the same service as the downlink data packet.

Step 53B, applying the QoS configuration of the determined uplink data packet. Obviously, according to the reflective QoS process on the user plane of the present disclosure, the UE may determine whether to apply the reflective QoS for the service of the downlink data packet according to the downlink data packet reflective indication, and if yes, the QoS configuration of the uplink packet is generated based on the QFI of the downlink data packet, thereby avoiding requesting the QoS configuration from the network side, and reducing the signaling burden on the network side.

Further, after the service that initiates the reflective QoS ends, the UE needs to end the QoS configuration of the uplink data packet of the service.

The ending manner on the user plane is the same as the ending manner on the control plane introduced above, and therefore will not be described again herein.

The reflective QoS method on the user plane is described in detail in combination with the practical application.

Third Practical Application

Figure 8:
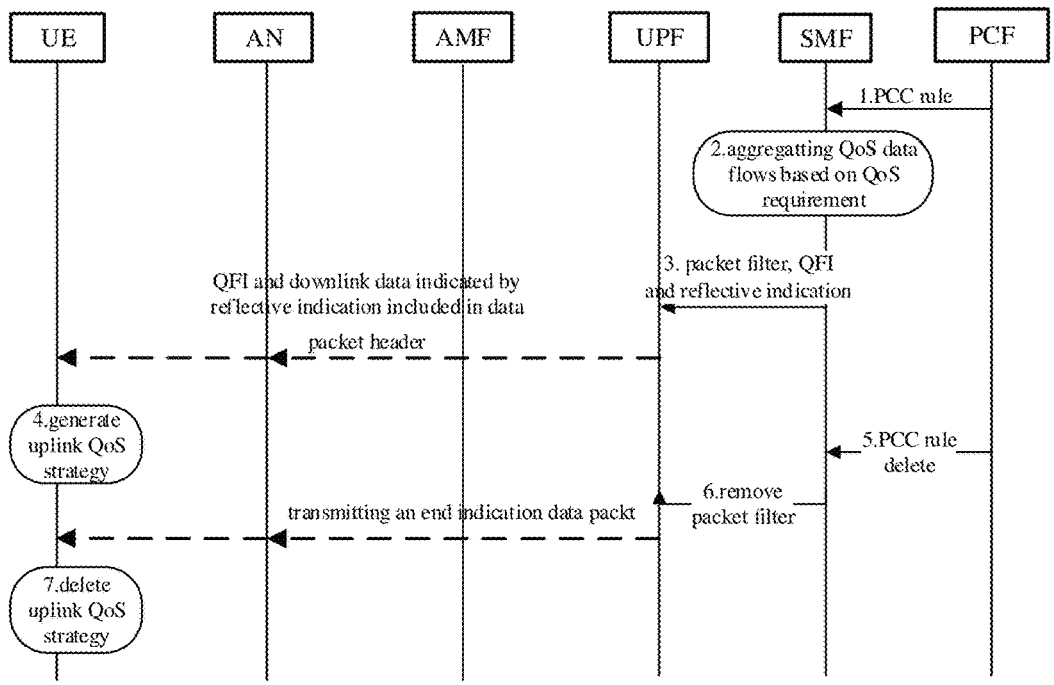
FIG. 8 is another detailed flowchart of a QoS control method based on a control plane according to an embodiment of the present disclosure.

As shown in FIG. 8, the reflective QoS method on the user plane includes the following steps.

Step 1: determining, by the PCF, that the reflective QoS applies for a service when the service is started. For example, the IP address of the data flow of the service changes frequently, for a service for which the reflective QoS applies, the PCF adds a reflective indication in the corresponding PCC rule and transmit the same to the SMF. The PCC rule includes an IP address of the service data flow, and QoS requirements such as 5QI and ARP, and the reflective indication.

Step 2: aggregating, by the SMF, the services having the same QoS service requirement into the same QoS data flow if the reflective QoS based on the user plane mode is adopted, and assigning a QFI for the QoS data flow. That is, the service for which the reflective applies and the service for which the reflective does not apply are aggregated in the same QoS data flow only if they have the same QoS requirements.

Step 3: transmitting, by the SMF, the packet filter information of the service and the corresponding QFI and reflective indication to the UPF if the reflective QoS based on the user plane mode is adopted. After receiving the downlink data, the UPF adds a QFI and a reflective indication to the packet header of the matched data packet according to the packet filter, and sends the same to the UE through the AN.

Step 4: determining, by the UE, that the reflective QoS applies on the data packet according to the reflective indication of the data packet header after the UE receives the downlink data, and generating, by the UE, the QoS policy of the uplink data according to the IP packet header and the QFI of the downlink data packet.

Step 5: instructing, by the PCF, the SMF to delete the PCC rule when the service ends.

Step 6: instructing, by the SMF, the UPF to delete the corresponding packet filter. The UPF delete the packet filter and sends an end indication data packet to the UE.

Step 7: deleting, by the UE, the uplink QoS rule generated by the UE according to the received end indication data packet.

Fourth Practical Application

Figure 9:
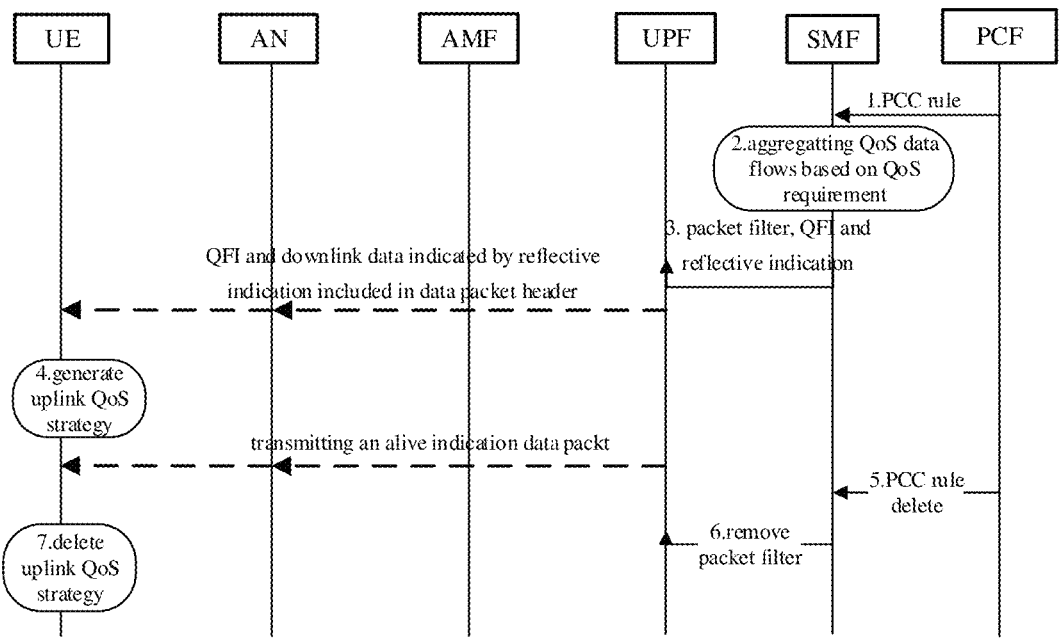
FIG. 9 is another flowchart of a QoS control method based on a user plane according to an embodiment of the present disclosure.

As shown in FIG. 9, steps 1-4 of the fourth practical application are the same as the third practical application. The difference is that the UE starts a timer for a generated uplink QoS rule, and the UPF also keeps a synchronized timer, for example, a default timer value. For a specific packet filter, the UPF restarts the timer every time a downlink data matching the packet filter information is transmitted, and when the UE receives the first downlink data packet, the UE generates a corresponding uplink QoS rule including the packet filter for reflective QoS. When the UE receives the corresponding downlink data again, the UE restarts a timer of the uplink QoS rule. When the timer expires, the UE deletes the uplink QoS rule. Before the UPF receives an indication from the SMF for deleting the packet filter due to the end of the service, if the UE still does not receive the downlink data packet of the packet filter at a specific time just before the timer expires (for example, 1 second before the timer expires), the UE generates one or more alive indication data packets matching the packet filter by simulation and sent the same to the UE, and the IP packet header of the alive indication data packet is the same as the downlink data packet received from the UPF and matching the packet filter. After receiving the data packet, the UE restarts the timer corresponding to the uplink QoS rule, and keep the uplink QoS configuration generated by the UE side alive.

Step 6: instructing, by the PCF, the SMF to delete the PCC rule when the service ends.

Step 7: instructing, by the SMF, the UPF to delete the corresponding packet filter information.

Step 8: determining, by the UE, that the service of the downlink data packet has ended after the timer expires and the UE does not receive the downlink data packet of a reflective task, and deleting the corresponding uplink QoS rule generated by the UE.

In summary, the present disclosure solve the problem in the related art of the aggregation of service data flows after the introduction of the reflective policy technology in the QoS control mechanism, and how to ensure that the UE correctly performs reflective QoS according to the network indication to generate an uplink QoS rule, and how to ensure that the UE deletes the QoS rules generated by the UE after the end of the service. According to the solution of the present disclosure, the UE can correctly generate and delete the reflective QoS policy under the control of the network, and the Internet service is supported in the 5G network.

Figure 10:
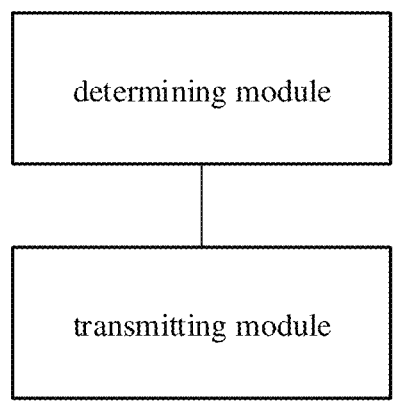
FIG. 10 is a schematic diagram of a policy control function node according to an embodiment of the present disclosure.

In addition, an embodiment of the present disclosure further provides a policy control function node PCF, as shown in FIG. 10, the PCF includes: a determining module, configured to determine a service for which a reflective QoS applies; a transmitting module, configured to transmit a PCC rule to the SMF, where the PCC rule carries the packet filter information, the QoS requirement, and the reflective indication of the service corresponding to the PCC rule, the reflective indication is used to indicate that the reflective QoS applies for the service corresponding to the PCC rule.

The determining module includes: a first determining sub-module, configured to determine a service in which a IP address of the data flow is changed as a service for which the reflective QoS applies; and/or a second determining sub-module, configured to determine a service in which the data flow has discontinuous IP addresses and the number of the discontinuous IP addresses is greater than a preset threshold as a service for which the reflective QoS applies.

Apparently, the PCF of the present embodiment is an implementation body of the above QoS control method applied to the PCF. Therefore, the technical effect achieved by the QoS control method applied to the PCF is also achieved in the PCF in the embodiment.

Figure 11:
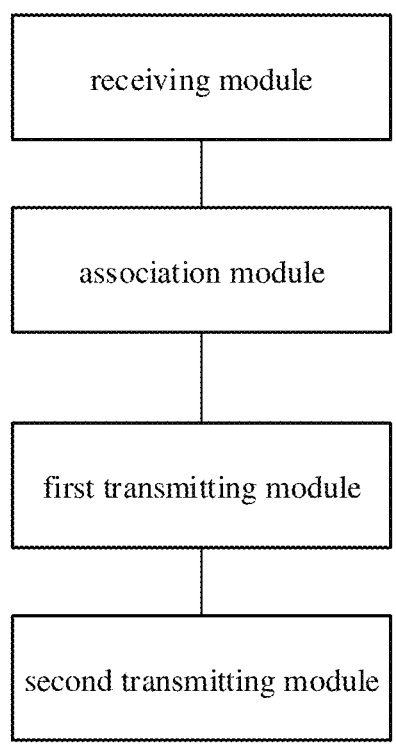
FIG. 11 and FIG. 12 are schematic diagrams showing a session management function control node according to an embodiment of the present disclosure.

In addition, an embodiment of the present disclosure further provides a SMF, as shown in FIG. 11, includes: a receiving module, configured to receive a PCC rule carrying the QoS requirement, the packet filter information, and the reflective indication. The reflective indication is used to indicate that the reflective QoS applies for a service corresponding to the PCC rule; an association module, configured to associate the PCC rule having the same QoS requirements and including the reflective indication to a same QoS data flow, and assign a corresponding QoS flow identifier to each QoS data flow; a first transmitting module, configured to transmit a QoS flow identifier indication message to the UE, the QoS flow identifier indication message carrying a QoS flow identifier of a service for which the reflective QoS applies, and the reflective indication information for indicating that the reflective applies for the QoS flow identifier, so that the UE determines, according to the QoS flow identifier indication message, a QoS flow identifier of a service for which the reflective QoS applies; and a second transmitting module, configured to transmit a configuration message of the service to the UPF, where the configuration message carries the packet filter information and the QoS flow identifier of the service, so that the UPF can match the downlink data packet of the service corresponding to the configuration message according to the packet filter information in the configuration message, and add the QoS flow identifier in the configuration message to the packet header of the matched downlink data, so that when the UE receives subsequent downlink data packet, the UE compares a QoS data flow identifier of the packet header of the downlink data packet and a QoS data flow identifier determined by the QoS flow identifier indication message, and determines whether to apply the reflective QoS for the downlink data packet service, and when the UE determines that the reflective QoS needs to be initiated for the service of the downlink data packet, the reflective QoS is applied for the service to obtain a QoS configuration of the uplink data packet of the service.

Figure 12:
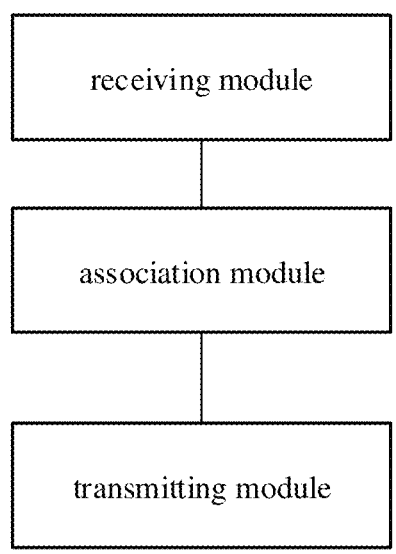

In addition, an embodiment of the present disclosure further provides a session management function control node, as shown in FIG. 12, including: a receiving module, configured to receive from a policy control function node a PCC rule carrying the QoS requirement, the packet filter information, and the reflective indication, where the reflective indication is used to indicate that the reflective QoS applies for the service corresponding to the PCC rule; an association module, configured to associate the PCC rule having the same QoS requirement to the same QoS data flow, and assign a corresponding QoS flow identifier to each data flow; and a transmitting module, configured to transmit a configuration message of the service to the user plane function node, where the configuration message carries packet filter information and QoS flow identifier of the service, and when the reflective QoS applies for the service, the configuration message further carries a reflective indication, so that the user plane function node can match downlink data packet of the service corresponding to the configuration message according to the packet filter information in the configuration message, and add a QoS flow identifier of the corresponding service to the header of the matched downlink packet, and adds a reflective indication to the header of the downlink packet when the downlink data packet belongs to the service for which the reflective QoS applies, so that the UE subsequently receives the downlink data packet, the UE determines to apply the reflective QoS on the received downlink data packet according to the reflective indication in the data packet header.

Apparently, the SMF of the present embodiment corresponds to the above QoS control method applied to the SMF, and therefore the technical effect of the QoS control method applied to the SMF is achieved in the PCF of the embodiment.

Figure 13:
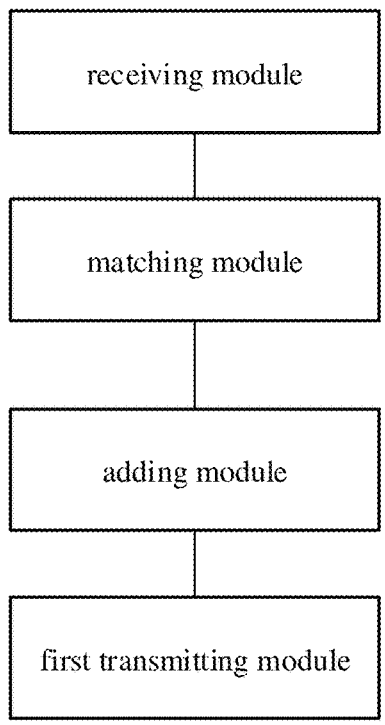
FIG. 13 and FIG. 14 are schematic diagrams showing a user plane function node according to an embodiment of the present disclosure.

In addition, an embodiment of the present disclosure further provides a user plane function node UPF, as shown in FIG. 13, including: a receiving module, configured to receive a configuration message of the service from the SMF, where the configuration message carries packet filter information and a QoS flow identifier of the service, the services having the same QoS requirement and for which the reflective QoS applies have the same QoS flow identifier; a matching module, configured to match the downlink data packet of the service corresponding to the configuration message based on the packet filter information in the configuration message; an adding module, configured to add a QoS flow identifier of the corresponding service to the packet header of the matched downlink data packet; and a first transmitting module, configured to transmit the downlink data packet to the UE.

The UPF of the embodiment further includes: a first timing module, configured to start timing for a service corresponding to a downlink data packet when the downlink data packet is transmitted to the UE; a reset module, configured to control the first timing module to restart timing if other downlink data packets of the service are received before a time duration reaches a first time threshold; a first deleting module, configured to delete the packet filter information of the service if the service ends before the time duration reaches the first time threshold; and a simulation module, configured to generate a downlink data packet of the service by simulation when the timing duration reaches the first time threshold and if other downlink data packets of the service are not received and the service is not end, transmit the downlink data packet generated by the simulation to the UE, where the downlink data packet generated by the simulation and a downlink data packet that is in the same service and not generated by simulation have a same header.

The user plane function node in this embodiment further includes a second deleting module, configured to delete the packet filter information of the service when determining that the service corresponding to the downlink data packet ends.

Obviously, the UPF of the present embodiment corresponds to the QoS control method applied to the UPF on the control plane, and therefore the technical effect of the QoS control method applied to the UPF on the control plane can be achieved by the UPF of the embodiment.

Figure 14:
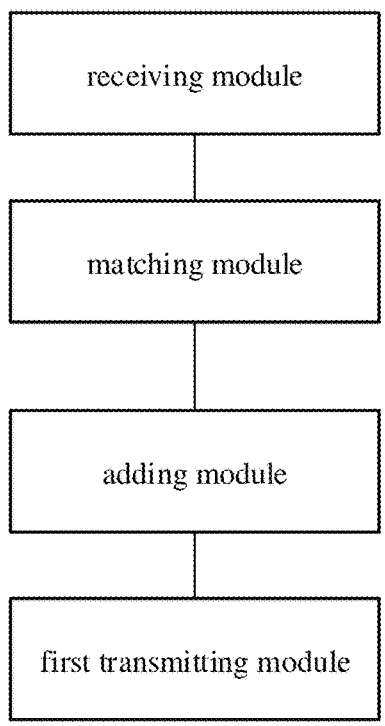

In addition, an embodiment of the present disclosure further provides a UPF, as shown in FIG. 14, including: a receiving module, configured to receive a configuration message of the service from the SMF, where the configuration message carries packet filter information and a QoS flow identifier of the service, when the reflective QoS applies for the service, the configuration message further carries a reflective indication, where services with the same QoS requirement have the same QoS flow identifier; a matching module, configured to match the downlink data packet of the service corresponding to the configuration message according to the packet filter information in the configuration message; an adding module, configured to add a QoS flow identifier of the corresponding service in the packet header of the downlink data packet, and add the reflective indication in a packet header of the downlink data packet when the downlink data packet belongs to a service for which the reflective QoS applies; and a first transmitting module, configured to transmit the downlink data packet to the UE.

The UPF of the embodiment further includes: a first timing module, configured to start timing for a service corresponding to the downlink data packet when the downlink data packet is transmitted to the UE; a reset module, configured to control the first timing module to restart timing if other downlink data packets of the service are received before the time duration reaches a first time threshold; a first deleting module, configured to delete the packet filter information of the service if the service ends before the time duration reaches the first time threshold; and a simulation module, configured to generate a downlink data packet of the service by simulation when the time duration reaches the first time threshold and if the other downlink data packets of the service are not received and the service is not end, and transmit the downlink data packet generated by simulation to the UE, and the downlink data packet generated by the simulation and a downlink data packet that is in the same service and not generated by simulation have a same header.

The UPF of the embodiment further includes: a second deleting module, configured to delete the packet filter information of the service when the service corresponding to the downlink data packet is determined to end; and a second transmitting module, configured to generate an end indication data packet of the service and send the end indication data packet to UE when it is determined that the service corresponding to the downlink data packet ends.

Obviously, the UPF of the present embodiment corresponds to the above QoS control method applied to the UPF on the user plane provided by the present disclosure, and therefore the technical effect of the QoS control method applied to the UPF on the user plane is achieved by the UPF of the embodiment.

Figure 15:
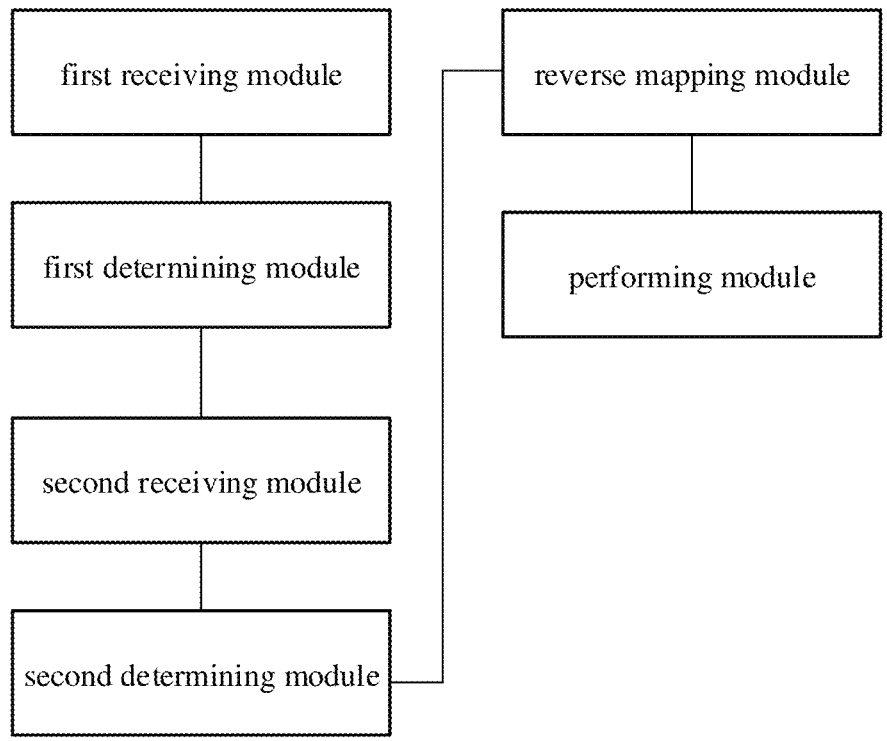
FIG. 15 and FIG. 16 are schematic diagrams showing the structure of a UE according to an embodiment of the present disclosure.

In addition, an embodiment of the present disclosure further provides a UE, as shown in FIG. 15, including: a first receiving module, configured to receive a QoS flow identifier indication message from the SMF, where the QoS flow identifier indication message includes a QoS flow identifier of a service for which the reflective QoS applies; a first determining module, configured to determine, according to the QoS flow identifier indication message, a QoS flow identifier for which the reflective QoS applies; a second receiving module, configured to receive the downlink data packet from a user plane function node, where a packet header of the downlink data packet carries a QoS flow identifier of the service; a second determining module, configured to determine whether to apply the reflective QoS for the service corresponding to the downlink data packet according to the QoS flow identifier carried in the downlink data packet and the determined QoS flow identifier for which the reflective QoS applies; a reflective module, configured to apply the reflective QoS when it is determined to apply the reflective QoS for the downlink data packet and determine the QoS configuration of the uplink data packet that belongs to the same service as the downlink data packet; and a performing module, configured to perform the QoS configuration of the uplink data packet.

The UE of this embodiment further includes: a timing module, configured to start timing when performing the QoS configuration of the uplink data packet; a reset module, configured to control the timing module to restart timing if the second receiving module receives the downlink data packet that belongs to the same service as the uplink data packet before the time duration reaches a second time threshold; a first stopping module, configured to control the execution module to stop performing the QoS configuration of the uplink data packet if the second receiving module does not receive the downlink data packet that belongs to the same service as the uplink data packet when the time duration reaches the second time threshold.

The UE of this embodiment further includes: a third receiving module, configured to receive an end indication data packet corresponding to the service of the uplink data packet sent by the user plane function node during performing the QoS configuration of the uplink data packet; a second stopping module, configured to control the execution module to stop performing the QoS configuration of the uplink data packet when the third receiving module has received the end indication data packet corresponding to the service of the uplink data packet sent by the user plane function node.

Obviously, the UE in this embodiment corresponds to the above QoS control method applied to the UE on the control plane provided by the present disclosure, and therefore the technical effect of the QoS control method applied to the UE on the control plane can be achieved by the UE of the embodiment.

Figure 16:
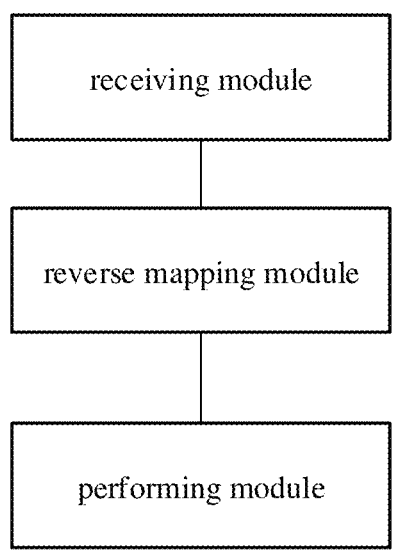

In addition, an embodiment of the present disclosure further provides a UE, as shown in FIG. 16, including: a receiving module, configured to receive a downlink data packet from the user plane function node, where the downlink data packet carries a QoS flow identifier of a service corresponding to the downlink data packet, and when the downlink data packet belongs to a service for which the reflective QoS applies, the downlink data packet further carries a reflective indication; a reflective module, configured to apply the reflective QoS when the downlink data packets carries the reflective indication, and determine the QoS configuration of an uplink data packet that belongs to the same service as the downlink data packet; and a performing module, configured to perform the QoS configuration of the uplink data packet.

The UE of this embodiment further includes: a timing module, configured to start timing when performing the QoS configuration of the uplink data packet; a reset module, configured to restart the timing if the receiving module receives the downlink data packet that belongs to the same service as the uplink data packet before the time duration reaches the second time threshold; a first stopping module, configured to control the performing module stop performing the QoS configuration of the uplink data packet if the receiving module does not receive the downlink data packet that belongs to the same service as the uplink data packet when the time duration reaches the second time threshold.

The UE of this embodiment further includes: a second stopping module, configured to stop performing the QoS configuration of the uplink data packet if the end indication data packet corresponding to the service of the uplink data packet is received from the user plane function node during performing the QoS configuration of the uplink data packet.

Obviously, the UE in this embodiment corresponds to the above QoS control method applied to the UE on the user plane provided by the present disclosure. Therefore, the technical effect of the QoS control method applied to the UE on the user plane can be achieved by the UE of the embodiment.

Moreover, embodiments of the present disclosure also provide a policy control function node PCF including a memory, a processor, and a computer program stored on the memory and executed by the processor, so as to: determine a service for which a reflective QoS applies; and transmit a PCC rule to the SMF, where the PCC rule carries the packet filter information, the QoS requirement, and the reflective indication of the corresponding service, the reflective indication is used to indicate that the reflective QoS applies for the service corresponding to the PCC rule.

Specifically, the processor and the memory of the embodiment are connected by a bus structure, and the bus interface may include any number of buses and bridges connected to each other. The circuits such as one or more processors represented by the processor and the memory are linked together. The bus interface also links various other circuits such as peripherals, voltage regulators, and power management circuits.

Furthermore, embodiments of the present disclosure also provide a computer readable storage medium having stored thereon a computer program that, when executed by a processor, implements the following steps: determine a service for which a reflective QoS applies; and transmit a PCC rule to the SMF, where the PCC rule carries the packet filter information, the QoS requirement, and the reflective indication of the corresponding service, the reflective indication is used to indicate that the reflective QoS applies for the service corresponding to the PCC rule.

Moreover, embodiments of the present disclosure also provide a session management function control node SMF, including a memory, a processor, and a computer program stored on the memory and executed by the processor, so as to: receive a PCC rule carrying the QoS requirement, the packet filter information, and the reflective indication from the policy control function node, the reflective indication is used to indicate that the reflective QoS applies for a service corresponding to the PCC rule; associate the PCC rule having the same QoS requirements and including the reflective indication to a same QoS data flow, and assign a corresponding QoS flow identifier to each QoS data flow; transmit a QoS flow identifier indication message to the UE, the QoS flow identifier indication message carrying a QoS flow identifier of a service for which the reflective QoS applies, and the reflective indication information for indicating that the reflective applies for the QoS flow identifier, so that the UE determines, according to the QoS flow identifier indication message, a QoS flow identifier of a service for which the reflective QoS applies; and transmit a configuration message of the service to the user plane function node, where the configuration message carries the packet filter information and the QoS flow identifier of the service, so that the user plane function node can match the downlink data packet of the service corresponding to the configuration message according to the packet filter information in the configuration message, and add the QoS flow identifier in the configuration message to the packet header of the matched downlink data, so that when the UE receives subsequent downlink data packet, the UE compares a QoS data flow identifier of the packet header of the downlink data packet with a QoS data flow identifier determined by the QoS flow identifier indication message, and determines whether to apply the reflective QoS for the downlink data packet service, and when the UE determines that the reflective QoS needs to be initiated for the service of the downlink data packet, the reflective QoS is applied for the service to obtain a QoS configuration of the uplink data packet of the service.

Specifically, the processor and the memory of the embodiment are connected by a bus structure, and the bus interface may include any number of buses and bridges connected to each other. The circuits such as one or more processors represented by the processor and the memory are linked together. The bus interface also links various other circuits such as peripherals, voltage regulators, and power management circuits.

Furthermore, embodiments of the present disclosure also provide a computer readable storage medium having stored thereon a computer program that, when executed by a processor, so as to: receive a PCC rule carrying the QoS requirement, the packet filter information, and the reflective indication from the policy control function node, the reflective indication is used to indicate that the reflective QoS applies for a service corresponding to the PCC rule; associate the PCC rule having the same QoS requirements and including the reflective indication to a same QoS data flow, and assign a corresponding QoS flow identifier to each QoS data flow; transmit a QoS flow identifier indication message to the UE, the QoS flow identifier indication message carrying a QoS flow identifier of a service for which the reflective QoS applies, and the reflective indication information for indicating that the reflective applies for the QoS flow identifier, so that the UE determines, according to the QoS flow identifier indication message, a QoS flow identifier of a service for which the reflective QoS applies; and transmit a configuration message of the service to the user plane function node, where the configuration message carries the packet filter information and the QoS flow identifier of the service, so that the user plane function node can match the downlink data packet of the service corresponding to the configuration message according to the packet filter information in the configuration message, and add the QoS flow identifier in the configuration message to the packet header of the matched downlink data, so that when the UE receives subsequent downlink data packet, the UE compares a QoS data flow identifier of the packet header of the downlink data packet with a QoS data flow identifier determined by the QoS flow identifier indication message, and determines whether to apply the reflective QoS for the downlink data packet service, and when the UE determines that the reflective QoS needs to be initiated for the service of the downlink data packet, the reflective QoS is applied for the service to obtain a QoS configuration of the uplink data packet of the service.

Moreover, embodiments of the present disclosure also provide a session management function control node SMF, including a memory, a processor, and a computer program stored on the memory and executable on the processor, wherein the processor of this embodiment executes the program, so as to: receive from policy control function node a PCC rule carrying the QoS requirement, the packet filter information, and the reflective indication, where the reflective indication is used to indicate that the reflective QoS applies for the service corresponding to the PCC rule; associate the PCC rule having the same QoS requirement to the same QoS data flow, and assign a corresponding QoS flow identifier to each data flow; transmit a configuration message of the service to the user plane function node, where the configuration message carries packet filter information and QoS flow identifier of the service, and when the reflective QoS applies for the service, the configuration message further carries a reflective indication, so that the user plane function node can match downlink data packet of the service corresponding to the configuration message according to the packet filter information in the configuration message, and add a QoS flow identifier of the corresponding service to the header of the matched downlink packet, and adds a reflective indication to the header of the downlink packet when the downlink data packet belongs to the service for which the reflective QoS applies, so that the UE subsequently receives the downlink data packet, the UE determines to apply the reflective QoS on the received downlink data packet according to the reflective indication in the data packet header.

Specifically, the processor and the memory of the embodiment are connected by a bus structure, and the bus interface may include any number of buses and bridges connected to each other. The circuits such as one or more processors represented by the processor and the memory are linked together. The bus interface also links various other circuits such as peripherals, voltage regulators, and power management circuits.

Furthermore, embodiments of the present disclosure also provide a computer readable storage medium having stored thereon a computer program that, when executed by a processor, so as to: receive from policy control function node a PCC rule carrying the QoS requirement, the packet filter information, and the reflective indication, where the reflective indication is used to indicate that the reflective QoS applies for the service corresponding to the PCC rule; associate the PCC rule having the same QoS requirement to the same QoS data flow, and assign a corresponding QoS flow identifier to each data flow; transmit a configuration message of the service to the user plane function node, where the configuration message carries packet filter information and QoS flow identifier of the service, and when the reflective QoS applies for the service, the configuration message further carries a reflective indication, so that the user plane function node can match downlink data packet of the service corresponding to the configuration message according to the packet filter information in the configuration message, and add a QoS flow identifier of the corresponding service to the header of the matched downlink packet, and adds a reflective indication to the header of the downlink packet when the downlink data packet belongs to the service for which the reflective QoS applies, so that the UE subsequently receives the downlink data packet, the UE determines to apply the reflective QoS on the received downlink data packet according to the reflective indication in the data packet header.

In addition, embodiments of the present disclosure also provide a user plane function node UPF, including a memory, a processor, and a computer program stored on the memory and executed by the processor, wherein the processor of this embodiment executes the program, so as to: receive a configuration message of the service from the SMF, where the configuration message carries packet filter information and a QoS flow identifier of the service, the services having the same QoS requirement and for which the reflective QoS applies have the same QoS flow identifier; match the downlink data packet of the service corresponding to the configuration message based on the packet filter information in the configuration message; add a QoS flow identifier of the corresponding service to the packet header of the matched downlink data packet; and transmit the downlink data packet to the UE.

Specifically, the processor and the memory of the embodiment are connected by a bus structure, and the bus interface may include any number of buses and bridges connected to each other. The circuits such as one or more processors represented by the processor and the memory are linked together. The bus interface also links various other circuits such as peripherals, voltage regulators, and power management circuits.

Specifically, the processor of this embodiment executes the above program, so as to: start timing for a service corresponding to a downlink data packet when the downlink data packet is transmitted to the UE; restart timing if other downlink data packets of the service are received before a time duration reaches a first time threshold; delete the packet filter information of the service if the service ends before the time duration reaches the first time threshold; and generate a downlink data packet of the service by simulation when the timing duration reaches the first time threshold and if other downlink data packets of the service are not received and the service is not end, transmit the downlink data packet generated by the simulation to the UE, where the downlink data packet generated by the simulation and a downlink data packet that is in the same service and not generated by simulation have a same header.

Specifically, the processor of this embodiment executes the foregoing program, so as to: delete the packet filter information of the service when determining that the service corresponding to the downlink data packet ends, generate an end indication data packet of the service and transmit the same to the UE.

Furthermore, embodiments of the present disclosure also provide a computer readable storage medium having stored thereon a computer program; wherein the program is executed by the processor, so as to: receive a configuration message of the service from the SMF, where the configuration message carries packet filter information and a QoS flow identifier of the service, the services having the same QoS requirement and for which the reflective QoS applies have the same QoS flow identifier; match the downlink data packet of the service corresponding to the configuration message based on the packet filter information in the configuration message; add a QoS flow identifier of the corresponding service to the packet header of the matched downlink data packet; and transmit the downlink data packet to the UE.

Specifically, the processor of this embodiment executes the above program, so as to: start timing for a service corresponding to a downlink data packet when the downlink data packet is transmitted to the UE; restart timing if other downlink data packets of the service are received before a time duration reaches a first time threshold; delete the packet filter information of the service if the service ends before the time duration reaches the first time threshold; and generate a downlink data packet of the service by simulation when the timing duration reaches the first time threshold and if other downlink data packets of the service are not received and the service is not end, transmit the downlink data packet generated by the simulation to the UE, where the downlink data packet generated by the simulation and a downlink data packet that is in the same service and not generated by simulation have a same header.

Specifically, the processor of this embodiment executes the foregoing program, so as to: delete the packet filter information of the service when determining that the service corresponding to the downlink data packet ends, generate an end indication data packet of the service and transmit the same to the UE.

In addition, an embodiment of the present disclosure further provides a UFP, including a memory, a processor, and a computer program stored on the memory and executed by the processor, the processor executes the program, so as to: receive a configuration message of the service from the SMF, where the configuration message carries packet filter information and a QoS flow identifier of the service, when the reflective QoS applies for the service, the configuration message further carries a reflective indication, where services with the same QoS requirement have the same QoS flow identifier; match the downlink data packet of the service corresponding to the configuration message according to the packet filter information in the configuration message; add a QoS flow identifier of the corresponding service in the packet header of the downlink data packet, and add the reflective indication in a packet header of the downlink data packet when the downlink data packet belongs to a service for which the reflective QoS applies; and transmit the downlink data packet to the UE.

Specifically, the processor and the memory of the embodiment are connected by a bus structure, and the bus interface may include any number of buses and bridges connected to each other. The circuits such as one or more processors represented by the processor and the memory are linked together. The bus interface also links various other circuits such as peripherals, voltage regulators, and power management circuits.

Specifically, the processor of this embodiment executes the program, so as to: start timing for a service corresponding to the downlink data packet when the downlink data packet is transmitted to the UE; restart timing if other downlink data packets of the service are received before the time duration reaches a first time threshold; delete the packet filter information of the service if the service ends before the time duration reaches the first time threshold; and generate a downlink data packet of the service by simulation when the time duration reaches the first time threshold and if the other downlink data packets of the service are not received and the service is not end, and transmit the downlink data packet generated by simulation to the UE, and the downlink data packet generated by the simulation and a downlink data packet that is in the same service and not generated by simulation have a same header.

Specifically, the processor of this embodiment executes the program, so as to: delete the packet filter information of the service when the service corresponding to the downlink data packet is determined to end; and generate an end indication data packet of the service and send the end indication data packet to UE.

Furthermore, embodiments of the present disclosure also provide a computer readable storage medium having stored thereon a computer program, when executed by the processor, so as to: receive a configuration message of the service from the SMF, where the configuration message carries packet filter information and a QoS flow identifier of the service, when the reflective QoS applies for the service, the configuration message further carries a reflective indication, where services with the same QoS requirement have the same QoS flow identifier; match the downlink data packet of the service corresponding to the configuration message according to the packet filter information in the configuration message; add a QoS flow identifier of the corresponding service in the packet header of the downlink data packet, and add the reflective indication in a packet header of the downlink data packet when the downlink data packet belongs to a service for which the reflective QoS applies; and transmit the downlink data packet to the UE.

Specifically, the program of this embodiment is executed by the processor, so as to: start timing for a service corresponding to the downlink data packet when the downlink data packet is transmitted to the UE; restart timing if other downlink data packets of the service are received before the time duration reaches a first time threshold; delete the packet filter information of the service if the service ends before the time duration reaches the first time threshold; and generate a downlink data packet of the service by simulation when the time duration reaches the first time threshold and if the other downlink data packets of the service are not received and the service is not end, and transmit the downlink data packet generated by simulation to the UE, and the downlink data packet generated by the simulation and a downlink data packet that is in the same service and not generated by simulation have a same header.

Specifically, the program of this embodiment is executed by the processor, so as to: delete the packet filter information of the service when the service corresponding to the downlink data packet is determined to end; and generate an end indication data packet of the service and send the end indication data packet to UE.

In addition, an embodiment of the present disclosure further provides a user equipment UE, including a memory, a processor, and a computer program stored on the memory and executed by the processor; wherein the processor execute the program, so as to: receive a QoS flow identifier indication message from the SMF, where the QoS flow identifier indication message carries a QoS flow identifier of a service for which the reflective QoS applies and a reflective indication message for indicating the reflective QoS applies for the QoS flow identifier; determine, according to the QoS flow identifier indication message, a QoS flow identifier for which the reflective QoS applies; receive the downlink data packet from a user plane function node, where a packet header of the downlink data packet carries a QoS flow identifier of the service; determine whether to apply the reflective QoS for the service corresponding to the downlink data packet by comparing the QoS flow identifier carried in the downlink data packet and the determined QoS flow identifier for which the reflective QoS applies; apply the reflective QoS when it is determined to apply the reflective QoS for the downlink data packet and determine the QoS configuration of the uplink data packet that belongs to the same service as the downlink data packet; and perform the QoS configuration of the uplink data packet.

Specifically, the processor and the memory of the embodiment are connected by a bus structure, and the bus interface may include any number of buses and bridges connected to each other. The circuits such as one or more processors represented by the processor and the memory are linked together. The bus interface also links various other circuits such as peripherals, voltage regulators, and power management circuits.

Specifically, the processor of this embodiment executes the program, so as to: start timing when performing the QoS configuration of the uplink data packet; restart timing if the downlink data packet that belongs to the same service as the uplink data packet is received before the time duration reaches a second time threshold; stop performing the QoS configuration of the uplink data packet if the downlink data packet that belongs to the same service as the uplink data packet is not received when the time duration reaches the second time threshold.

Specifically, the processor of this embodiment executes the program, so as to: stop performing the QoS configuration of the uplink data packet when the end indication data packet corresponding to the service of the uplink data packet is received from the user plane function node during performing the QoS configuration of the uplink data packet.

Furthermore, embodiments of the present disclosure also provide a computer readable storage medium having stored thereon a computer program, when the program executed by the processor, so as to: receive a QoS flow identifier indication message from the SMF, where the QoS flow identifier indication message carries a QoS flow identifier of a service for which the reflective QoS applies and a reflective indication message for indicating the reflective QoS applies for the QoS flow identifier; determine, according to the QoS flow identifier indication message, a QoS flow identifier for which the reflective QoS applies; receive the downlink data packet from a user plane function node, where a packet header of the downlink data packet carries a QoS flow identifier of the service; determine whether to apply the reflective QoS for the service corresponding to the downlink data packet by comparing the QoS flow identifier carried in the downlink data packet and the determined QoS flow identifier for which the reflective QoS applies; apply the reflective QoS when it is determined to apply the reflective QoS for the downlink data packet and determine the QoS configuration of the uplink data packet that belongs to the same service as the downlink data packet; and perform the QoS configuration of the uplink data packet Specifically, the processor of this embodiment executes the program, so as to: start timing when performing the QoS configuration of the uplink data packet; restart timing if the downlink data packet that belongs to the same service as the uplink data packet is received before the time duration reaches a second time threshold; stop performing the QoS configuration of the uplink data packet if the downlink data packet that belongs to the same service as the uplink data packet is not received when the time duration reaches the second time threshold.

Specifically, the processor of this embodiment executes the program, so as to: stop performing the QoS configuration of the uplink data packet when the end indication data packet corresponding to the service of the uplink data packet is received from the user plane function node during performing the QoS configuration of the uplink data packet.

In addition, an embodiment of the present disclosure further provides a user equipment UE, including a memory, a processor, and a computer program stored on the memory and executed by the processor; wherein the processor execute the program, so as to: receive a downlink data packet from the user plane function node, where the downlink data packet carries a QoS flow identifier of a service corresponding to the downlink data packet, and when the downlink data packet belongs to a service for which the reflective QoS applies, the downlink data packet further carries a reflective indication; apply the reflective QoS when the downlink data packets carries the a reflective indication, and determine the QoS configuration of an uplink data packet that belongs to the same service as the downlink data packet; and perform the QoS configuration of the uplink data packet.

Specifically, the processor and the memory of the embodiment are connected by a bus structure, and the bus interface may include any number of buses and bridges connected to each other. The circuits such as one or more processors represented by the processor and the memory are linked together. The bus interface also links various other circuits such as peripherals, voltage regulators, and power management circuits.

Specifically, the processor of this embodiment executes the program, so as to: start timing when performing the QoS configuration of the uplink data packet; restart timing if the downlink data packet that belongs to the same service as the uplink data packet is received before the time duration reaches a second time threshold; stop performing the QoS configuration of the uplink data packet if the downlink data packet that belongs to the same service as the uplink data packet is not received when the time duration reaches the second time threshold.

Specifically, the processor of this embodiment executes the program, so as to: stop performing the QoS configuration of the uplink data packet when the end indication data packet corresponding to the service of the uplink data packet is received from the user plane function node during performing the QoS configuration of the uplink data packet.

Furthermore, embodiments of the present disclosure also provide a computer readable storage medium having stored thereon a computer program, when the program executed by the processor, so as to: receive a downlink data packet from the user plane function node, where the downlink data packet carries a QoS flow identifier of a service corresponding to the downlink data packet, and when the downlink data packet belongs to a service for which the reflective QoS applies, the downlink data packet further carries a reflective indication; apply the reflective QoS when the downlink data packets carries the a reflective indication, and determine the QoS configuration of an uplink data packet that belongs to the same service as the downlink data packet; and perform the QoS configuration of the uplink data packet.

Specifically, the processor of this embodiment executes the program, so as to: start timing when performing the QoS configuration of the uplink data packet; restart timing if the downlink data packet that belongs to the same service as the uplink data packet is received before the time duration reaches a second time threshold; stop performing the QoS configuration of the uplink data packet if the downlink data packet that belongs to the same service as the uplink data packet is not received when the time duration reaches the second time threshold.

Specifically, the processor of this embodiment executes the program, so as to: stop performing the QoS configuration of the uplink data packet when the end indication data packet corresponding to the service of the uplink data packet is received from the user plane function node during performing the QoS configuration of the uplink data packet.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A Quality of Service (QoS) control method, applied to a policy control function node (PCF), comprising:
    determining a service for which a reflective QoS applies; and
    transmitting a policy and charging control (PCC) rule to a session management function node (SMF), wherein the PCC rule carries packet filter information, a QoS requirement, and a reflective indication of the service corresponding to the PCC rule, the reflective indication is used to indicate that the reflective QoS applies for the service corresponding to the PCC rule;
    wherein the determining a service for which a reflective QoS applies comprises:
        determining a service in which an internet protocol (IP) address of a data flow is changed as a service for which the reflective QoS applies; and/or
        determining a service in which the data flow has discontinuous IP addresses and the number of discontinuous IP addresses is greater than a preset threshold as a service for which the reflective QoS applies.

2. A policy control function node (PCF) comprising a memory, a processor, and a computer program stored on the memory and executed by the processor, wherein the processor is configured to call and execute the program stored in the memory to implement the QoS control method according to claim 1.

3. A Quality of Service (QoS) control method, applied to a session management function node (SMF), comprising:
    receiving from a policy control function node (PCF) a policy and charging control (PCC) rule carrying a QoS requirement, packet filter information, and a reflective indication, wherein the reflective indication is used to indicate that reflective QoS applies for a service corresponding to the PCC rule;
    associating the PCC rule having the same QoS requirement to a same QoS data flow, and assigning a corresponding QoS flow identifier to each data flow; and
    transmitting a configuration message of the service to a user plane function node (UPF), wherein the configuration message carries packet filter information of the service and a QoS flow identifier, and when the reflective QoS applies for the service, the configuration message further carries a reflective indication, so that the UFP matches a downlink data packet of the service corresponding to the configuration message according to the packet filter information in the configuration message, and adds a QoS flow identifier of the corresponding service to a packet header of the matched downlink data packet, and adds a reflective indication to the packet header of the downlink data packet when the downlink data packet belongs to the service for which the reflective QoS applies, so that a user equipment (UE) receives a subsequent downlink data packet, the UE determines to apply the reflective QoS on the received downlink data packet according to the reflective indication in the data packet header.

4. A session management function node (SMF) comprising a memory, a processor, and a computer program stored on the memory and executed by the processor, wherein the processor is configured to call and execute the program stored in the memory to implement the QoS control method according to claim 3.

5. A Quality of Service (QoS) control method, applied to a user plane function node (UPF), comprising:
    receiving a configuration message of a service from a session management function node (SMF), wherein the configuration message carries packet filter information of the service and a QoS flow identifier, when reflective QoS applies for the service, the configuration message further carries a reflective indication, services with the same QoS requirement have a same QoS flow identifier;
    matching a downlink data packet of the service corresponding to the configuration message according to the packet filter information in the configuration message;

adding a QoS flow identifier of the corresponding service in the packet header of the downlink data packet, and adding the reflective indication in a packet header of the downlink data packet when the downlink data packet belongs to a service for which the reflective QoS applies; and transmitting the downlink data packet to the UE.

6. The method according to claim 5, further comprising:

starting timing for the service corresponding to the downlink data packet when the downlink data packet is transmitted to the UE;

restarting timing if other downlink data packets of the service are received before a time duration reaches a first time threshold;

deleting the packet filter information of the service if the service ends before the time duration reaches the first time threshold; and generating a downlink data packet of the service by simulation when the time duration reaches the first time threshold, if the other downlink data packets of the service are not received and the service is not end, and transmitting the downlink data packet generated by simulation to the UE, wherein the downlink data packet generated by the simulation and a downlink data packet that is in the same service and not generated by simulation have a same header.

7. The method according to claim 6, further comprising:

deleting the packet filter information of the service when the service corresponding to the downlink data packet is determined to end; and transmitting an end indication data packet to UE.

8. A user plane function node (UPF), comprising a memory, a processor, and a computer program stored on the memory and executed by the processor, wherein the processor is configured to call and execute the program stored in the memory to implement the QoS control method according to claim 5.

* * * * *